US012047724B2

(12) United States Patent
Yang et al.

(10) Patent No.: US 12,047,724 B2
(45) Date of Patent: Jul. 23, 2024

(54) BLUETOOTH EARPHONE

(71) Applicant: Huawei Technologies Co., Ltd., Shenzhen (CN)

(72) Inventors: Chungwen Yang, Dongguan (CN); Hanyang Wang, Reading (GB); Huiliang Xu, Dongguan (CN); Zhaocai Zeng, Shanghai (CN); Haowen Xu, Dongguan (CN); Lin Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 132 days.

(21) Appl. No.: 17/760,635

(22) PCT Filed: Sep. 11, 2020

(86) PCT No.: PCT/CN2020/114635

§ 371 (c)(1),
(2) Date: Mar. 15, 2022

(87) PCT Pub. No.: WO2021/052242

PCT Pub. Date: Mar. 25, 2021

(65) Prior Publication Data

US 2022/0337933 A1 Oct. 20, 2022

(30) Foreign Application Priority Data

Sep. 17, 2019 (CN) ......................... 201910877504.4

(51) Int. Cl.

| | |
|---|---|
| ***H04R 1/10*** | (2006.01) |
| ***H01Q 1/27*** | (2006.01) |
| ***H01Q 1/38*** | (2006.01) |

(52) U.S. Cl.
CPC ........... *H04R 1/1016* (2013.01); *H01Q 1/273* (2013.01); *H01Q 1/38* (2013.01)

(58) Field of Classification Search
CPC .... H04R 1/1016; H04R 25/55; H04R 25/609; H04R 2225/51; H04R 25/602
(Continued)

(56) References Cited

U.S. PATENT DOCUMENTS

| | | | | |
|---|---|---|---|---|
| 10,555,097 B2 * | 2/2020 | Troelsen | .............. | H04R 25/554 |
| 10,764,666 B1 * | 9/2020 | Napoles | ................... | H01Q 7/00 |

(Continued)

FOREIGN PATENT DOCUMENTS

| | | |
|---|---|---|
| CN | 103219581 A | 7/2013 |
| CN | 106785414 A | 5/2017 |

(Continued)

*Primary Examiner* — Disler Paul
(74) *Attorney, Agent, or Firm* — Conley Rose, P.C.

(57) ABSTRACT

A BLUETOOTH earphone includes an antenna, the antenna comprises an antenna radiator, a first connecting portion, a second connecting portion, and a third connecting portion. The antenna radiator is located on a first portion of a flexible printed circuit (FPC) which is disposed in the earphone handle portion. The first connecting portion is a main ground of the BLUETOOTH earphone. The second connecting portion, is located on the earphone handle portion, and comprises a ground point. The third connecting portion is located on the earphone handle portion, and is connected to a first position on the second connecting portion other than the ground point, the third connecting portion and the antenna radiator are spaced apart with a first gap, and the third connecting portion is coupled to the antenna radiator through the first gap.

20 Claims, 21 Drawing Sheets

(58) Field of Classification Search
USPC .................................... 381/314, 74, 111, 311
See application file for complete search history.

(56) References Cited

U.S. PATENT DOCUMENTS

| | | | | |
|---|---|---|---|---|
| 10,827,249 | B1 * | 11/2020 | Pine | H04R 1/1041 |
| 10,924,864 | B2 * | 2/2021 | Xiao | H04R 9/045 |
| 11,323,796 | B2 * | 5/2022 | Fukahori | H04R 1/1041 |
| 11,689,839 | B2 * | 6/2023 | Huang | H04R 1/1075 381/74 |
| 2008/0166004 | A1 | 7/2008 | Sanford et al. | |
| 2011/0068985 | A1 | 3/2011 | Hillersborg | |
| 2012/0224710 | A1 | 9/2012 | Terlizzi et al. | |
| 2015/0043763 | A1 | 2/2015 | Troelsen et al. | |
| 2017/0201821 | A1 | 7/2017 | McAuliffe et al. | |
| 2018/0026338 | A1 | 1/2018 | Lin et al. | |
| 2019/0208337 | A1 | 7/2019 | Kvist et al. | |

FOREIGN PATENT DOCUMENTS

| | | | |
|---|---|---|---|
| CN | 206658277 | U | 11/2017 |
| CN | 108281759 | A | 7/2018 |
| CN | 207910054 | U | 9/2018 |
| CN | 108711668 | A | 10/2018 |
| CN | 208675488 | U | 3/2019 |
| CN | 109996164 | A | 7/2019 |
| CN | 110061356 | A | 7/2019 |
| CN | 209056590 | U | 7/2019 |
| CN | 110165378 | A | 8/2019 |
| CN | 110198505 | A | 9/2019 |
| WO | 2019119952 | A1 | 6/2019 |

* cited by examiner

BLUETOOTH EARPHONE

This is a U.S. National Stage of International Patent Application No. PCT/CN2020/114635 filed on Sep. 11, 2020, which claims priority to Chinese Patent Application No. 201910877504.4 filed on Sep. 17, 2019, both of which are hereby incorporated by reference in their entireties.

TECHNICAL FIELD

This application relates to the field of communications device technologies, and in particular, to a Bluetooth earphone.

BACKGROUND

Currently, a Bluetooth earphone is very popular with users for advantages such as convenience and miniaturization, and is increasingly widely used. However, in a conventional Bluetooth earphone, an antenna features poor antenna performance. In addition, to meet a requirement of compact layout, it is difficult to meet a requirement that there is no antenna clearance region or there is a small antenna clearance region, resulting in deterioration of the antenna performance of the antenna.

SUMMARY

This application provides a Bluetooth earphone, to improve antenna performance of the Bluetooth earphone, ensure a communication effect of the Bluetooth earphone, and meet a requirement that there is no antenna clearance region or there is a small antenna clearance region.

This application provides a Bluetooth earphone, including an earphone housing and a signal processing component. The earphone housing has a cavity. The signal processing component is located in the cavity. The signal processing component includes a flexible printed circuit FPC, a microphone, and an antenna radiator. The earphone housing includes an earbud portion and an earphone handle portion. The FPC is disposed on the earphone handle portion, and a part of the FPC extends to the earbud portion along a top end of the earphone handle portion. The microphone is disposed at a bottom end of the earphone handle portion. A signal end of the microphone is electrically connected to a control module on the FPC. The antenna radiator on the FPC is located on the earphone handle portion. A length of the antenna radiator is ¼ of a wavelength corresponding to an operating frequency band of the antenna radiator. The antenna radiator is electrically connected to the control module by using a feed point on the FPC. The feed point is located at the top end of the earphone handle portion. A first connecting portion on the FPC is located on the earbud portion. A length of the first connecting portion is ¼ of the wavelength. A ground terminal of the control module, the first connecting portion, and a ground point on the FPC share a ground. The ground point is located on the earphone handle portion. The ground point is at a preset distance from the feed point. A second connecting portion is located on the earphone handle portion. Aground terminal of the microphone is electrically connected to the ground point by using the second connecting portion. At least one third connecting portion extends from at least one position other than the ground point on the second connecting portion. The third connecting portion is located on the earphone handle portion. A total length of the second connecting portion and the third connecting portion is greater than ¼ of the wavelength. A current on the antenna radiator flows from the feed point to the bottom end of the earphone handle portion. A parasitic current on the third connecting portion flows from a position at which the third connecting portion is connected to the second connecting portion to an end of the third connecting portion. The current on the antenna radiator and the parasitic current on the third connecting portion are not in opposite directions.

According to the Bluetooth earphone provided in this application, it is set that the total length of the second connecting portion and the third connecting portion is greater than ¼ of the wavelength corresponding to the operating frequency band of the antenna radiator, the current on the antenna radiator flows from the feed point to the bottom end of the earphone handle portion, the third connecting portion is connected to the second connecting portion, a current on the second connecting portion flows from the bottom end of the earphone handle portion to the ground point, the parasitic current on the third connecting portion flows from the position at which the third connecting portion is connected to the second connecting portion to the end of the third connecting portion along a body of the third connecting portion, and the current on the antenna radiator and the parasitic current on the third connecting portion are not in opposite directions, so that the third connecting portion becomes a parasitic element of the antenna radiator. In this way, performance of the antenna radiator is improved, a requirement of compact layout of the Bluetooth earphone is met, a requirement that there is no antenna clearance region or there is a small antenna clearance region is met, and it is ensured that antenna the Bluetooth earphone has good antenna performance. In addition, both the antenna radiator and the second connecting portion are disposed on the FPC. Therefore, space of the Bluetooth earphone is saved, complexity of an assembly process is reduced, layout costs are reduced, and the requirement of compact layout of the Bluetooth earphone is further met.

In a possible design, the total length of the second connecting portion and the third connecting portion is less than or equal to ½ of the wavelength, to effectively improve antenna performance of the Bluetooth earphone.

In a possible design, the second connecting portion is disposed on the FPC. And then, both the antenna radiator and the second connecting portion are disposed on the FPC. Therefore, in comparison with a conventional Bluetooth earphone, space of the earphone handle portion in the Bluetooth earphone is saved, a process of assembling the Bluetooth earphone is simplified, layout costs are reduced, and the requirement of compact layout of the Bluetooth earphone is met.

In a possible design, any third connecting portion includes a connecting portion that extends from at least one position that is on the second connecting portion and that is close to the bottom end of the earphone handle portion to a direction close to the top end of the earphone handle portion. In this way, space of the earphone handle portion is fully used, and compact layout of the Bluetooth earphone is implemented.

In a possible design, the parasitic current on the third connecting portion and the current on the antenna radiator are in a same direction, so that the third connecting portion becomes a parasitic element of the antenna radiator, to improve performance of the antenna radiator.

In a possible design, the third connecting portion and the second connecting portion form a U-shaped structure. In this way, both the second connecting portion and the third connecting portion are in a straight-line shape and are parallel to each other. Therefore, space of the earphone housing is saved, space of the Bluetooth earphone is compact, and layout of an antenna architecture in the Bluetooth earphone is further facilitated.

In a possible design, the third connecting portion is disposed on the FPC. This process is simple and easy to perform, and space of the earphone handle portion is saved, so that the Bluetooth earphone meets the requirement of compact layout.

In a possible design, the third connecting portion is closely adjacent to the antenna radiator, to ensure that the third connecting portion serves as a parasitic element of the antenna radiator, so as to improve antenna performance.

In a possible design, the third connecting portion is disposed on an inner wall or an outer wall of the earphone handle portion. In this way, the earphone handle portion is fully used, and space of the earphone handle portion is saved, so that the Bluetooth earphone meets the requirement of compact layout.

In a possible design, there is an overlapping region between a projection of the third connecting portion on a plane on which the FPC is located in a vertical direction of the plane on which the FPC is located and the antenna radiator, so that the Bluetooth earphone has good antenna performance.

In a possible design, a projection of the third connecting portion on a plane on which the FPC is located in a vertical direction of the plane on which the FPC is located is closely adjacent to the antenna radiator, so that the Bluetooth earphone has relatively good antenna performance.

In a possible design, a projection of the third connecting portion on a plane on which the FPC is located in a vertical direction of the plane on which the FPC is located is far away from the antenna radiator, and is closely adjacent to the second connecting portion, so that the Bluetooth earphone has relatively good antenna performance.

In a possible design, any third connecting portion includes a bent connecting portion that extends from at least one position that is on the second connecting portion and that is close to the bottom end of the earphone handle portion to a direction close to the bottom end of the earphone handle portion. In this way, space at the bottom end of the earphone handle portion is fully used, and compact layout of the Bluetooth earphone is implemented.

In a possible design, the parasitic current on the third connecting portion tortuously flows from the position at which the third connecting portion is connected to the second connecting portion to the end of the third connecting portion, so that the third connecting portion becomes a parasitic element of the antenna radiator, to improve performance of the antenna radiator.

In a possible design, any third connecting portion includes a connecting portion that extends from at least one position that is on the second connecting portion and that is close to the bottom end of the earphone handle portion to a direction close to the top end of the earphone handle portion and a bent connecting portion that extends from the at least one position that is on the second connecting portion and that is close to the bottom end of the earphone handle portion to a direction close to the bottom end of the earphone handle portion.

In a possible design, any third connecting portion includes a metal outer wall of a battery and a connecting portion connected to the metal outer wall of the battery and at least one position that is on the second connecting portion and that is close to the bottom end of the earphone handle portion. In this way, space occupied by the battery is fully used, space of the earphone handle portion is saved, and compact layout of the Bluetooth earphone is implemented.

In a possible design, any third connecting portion includes a connecting portion that extends from at least one position that is on the second connecting portion and that is close to the bottom end of the earphone handle portion to a direction close to the top end of the earphone handle portion, a metal outer wall of a battery, and a connecting portion connected to the metal outer wall of the battery and the at least one position that is on the second connecting portion and that is close to the bottom end of the earphone handle portion.

In a possible design, any third connecting portion includes a bent connecting portion that extends from at least one position that is on the second connecting portion and that is close to the bottom end of the earphone handle portion to a direction close to the bottom end of the earphone handle portion, a metal outer wall of a battery, and a connecting portion connected to the metal outer wall of the battery and the at least one position that is on the second connecting portion and that is close to the bottom end of the earphone handle portion.

In a possible design, any third connecting portion includes a connecting portion that extends from at least one position that is on the second connecting portion and that is close to the bottom end of the earphone handle portion to a direction close to the top end of the earphone handle portion, a bent connecting portion that extends from the at least one position that is on the second connecting portion and that is close to the bottom end of the earphone handle portion to a direction close to the bottom end of the earphone handle portion, a metal outer wall of a battery, and a connecting portion connected to the metal outer wall of the battery and the at least one position that is on the second connecting portion and that is close to the bottom end of the earphone handle portion.

In a possible design, the signal processing component includes a speaker and the battery. The speaker is disposed on the earbud portion, and the control module on the FPC is electrically connected to the speaker. The battery is disposed on the earphone handle portion, and the battery supplies power to the Bluetooth earphone.

Figure 7:
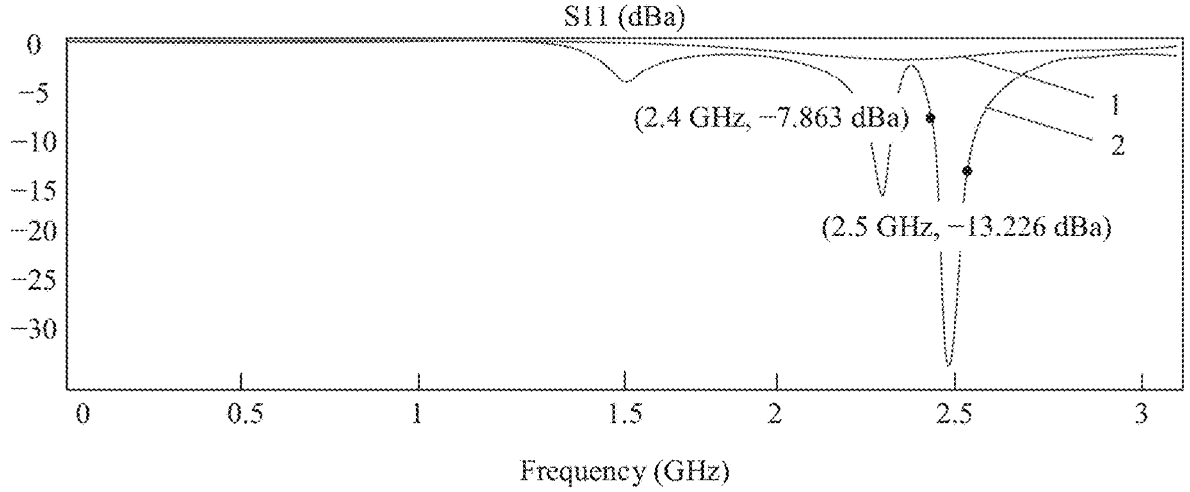
Figure 8:
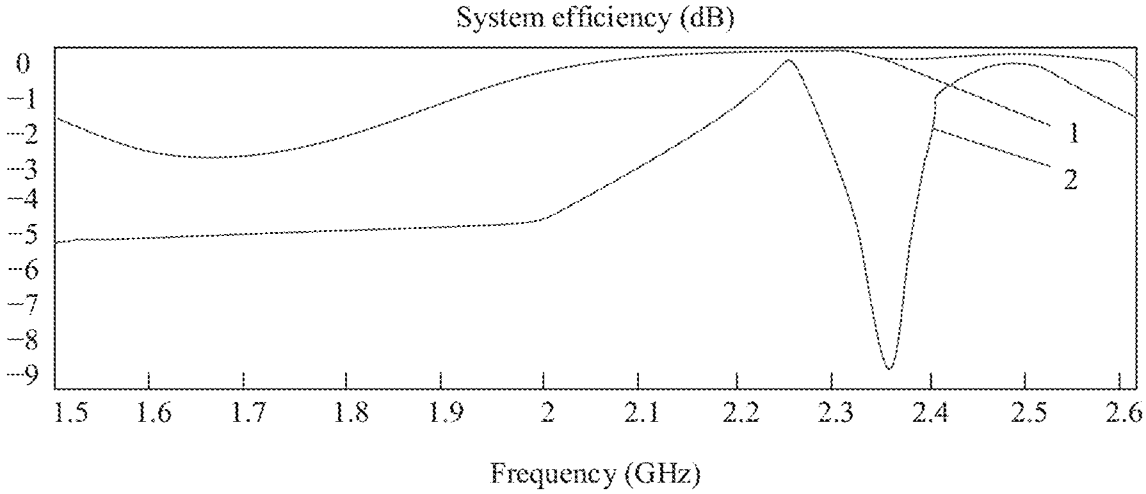
Figure 9A:
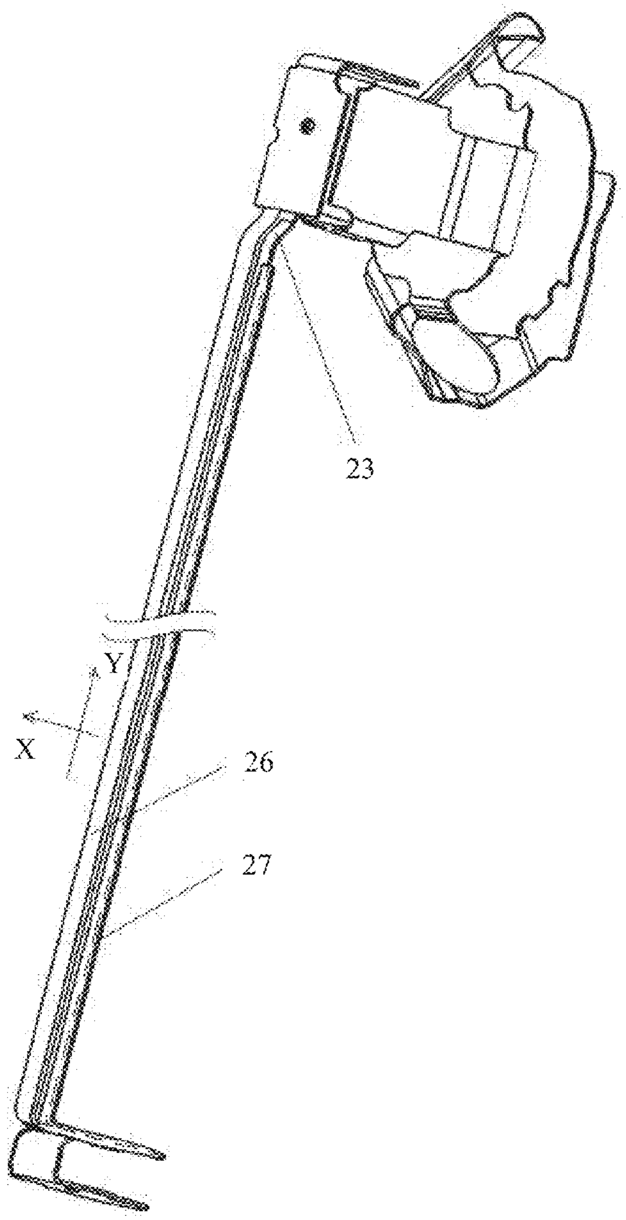
Figure 9B:
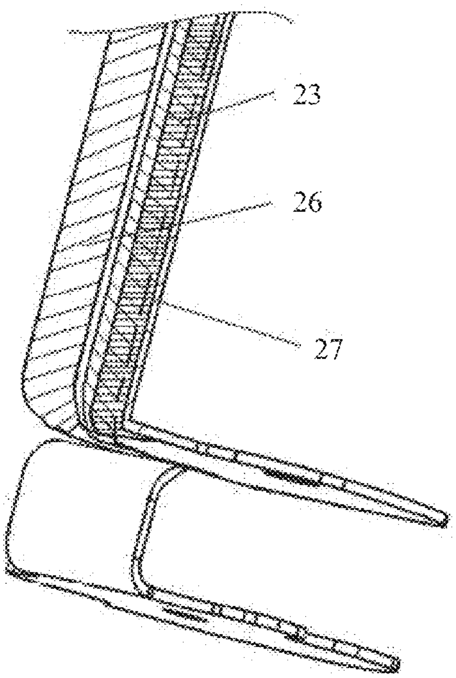
Figure 9C:
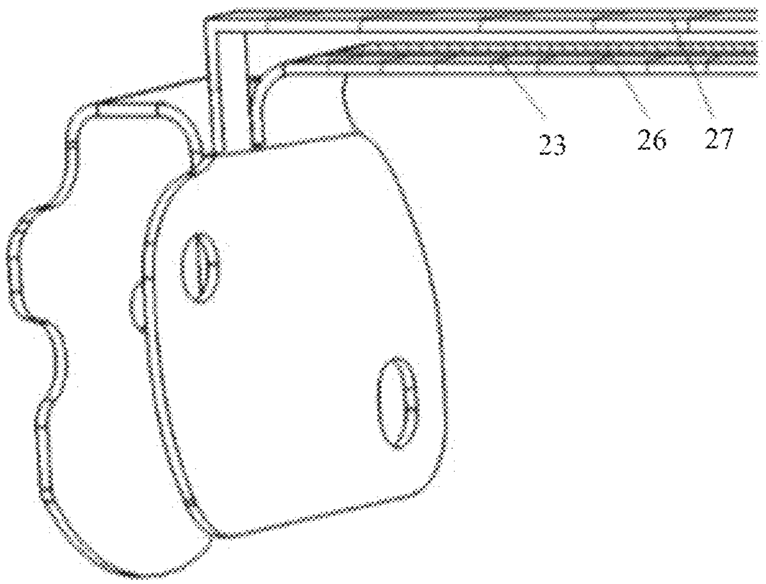
Figure 10:
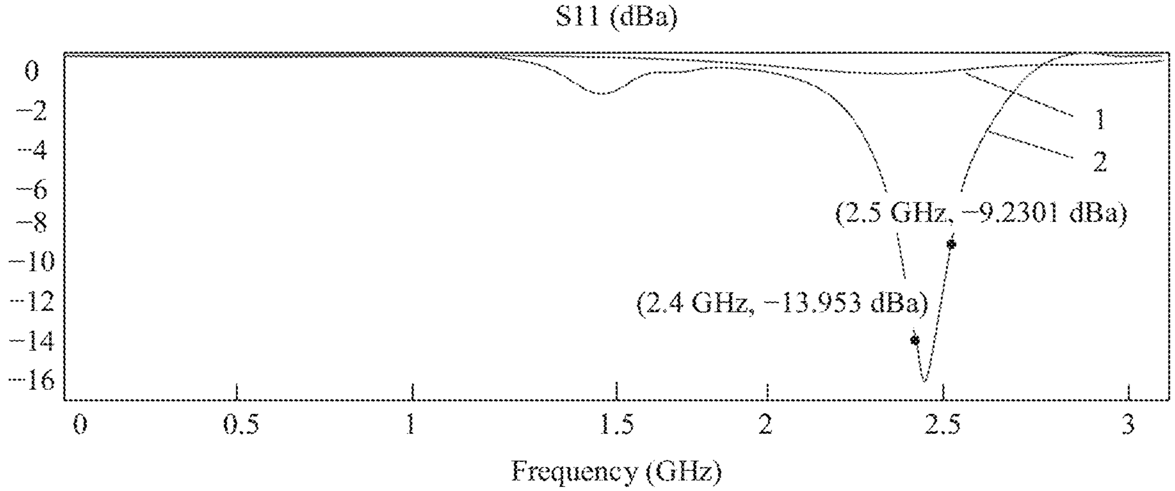
Figure 11:
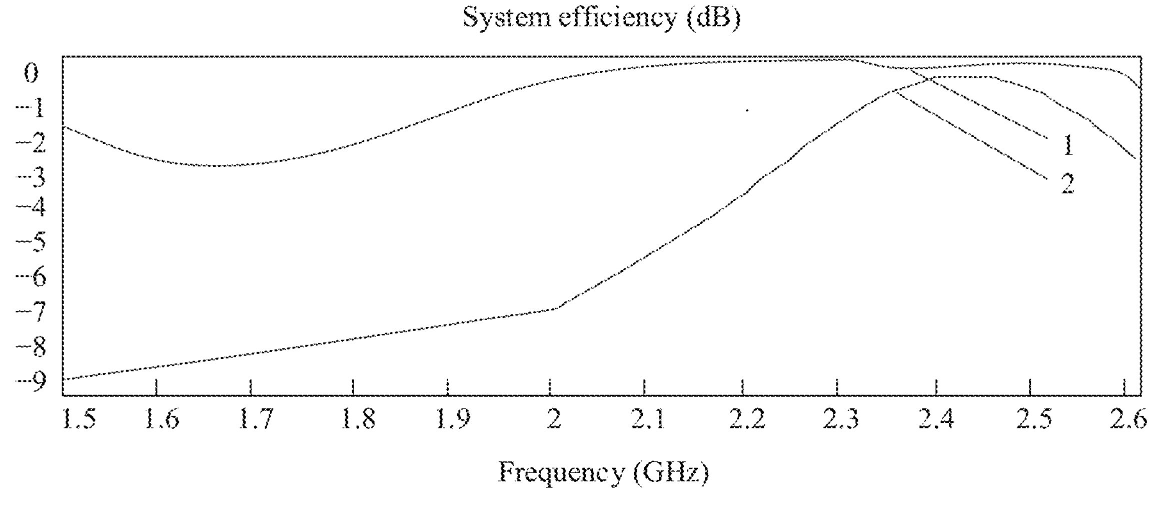
Figure 12:
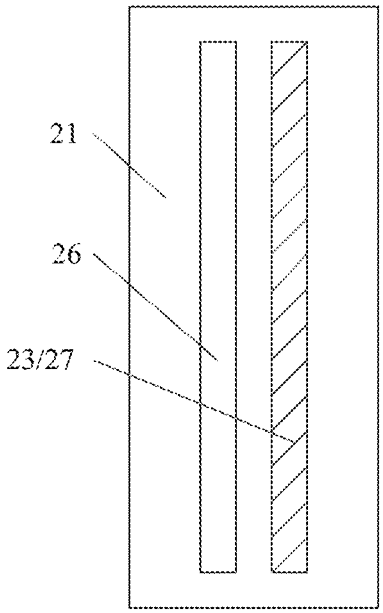
Figure 13:
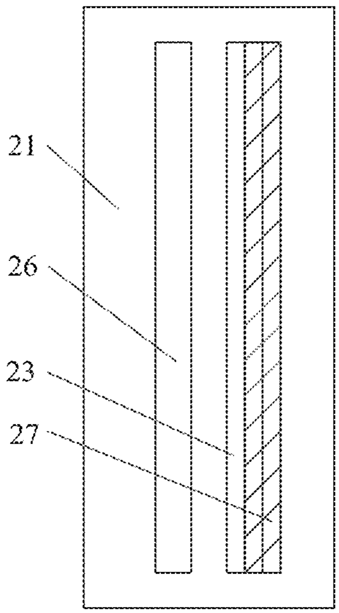
Figure 14:
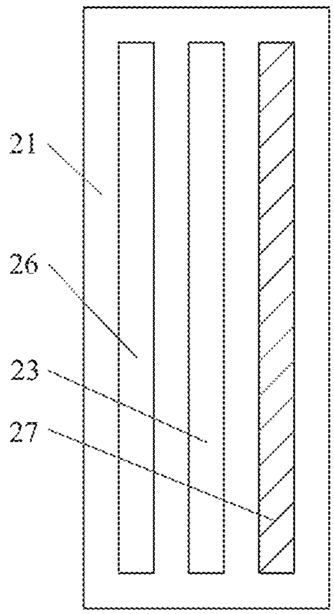
Figure 15:
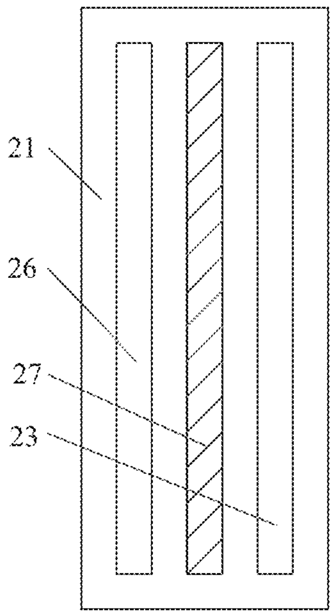
Figure 16:
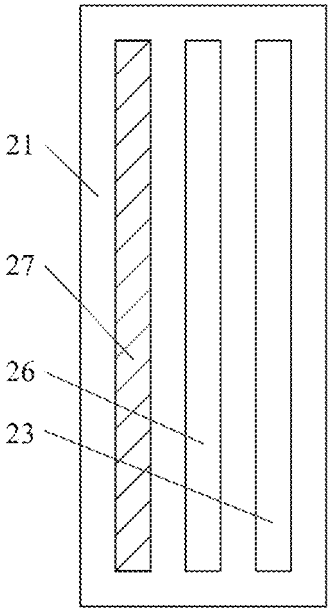
Figure 17A:
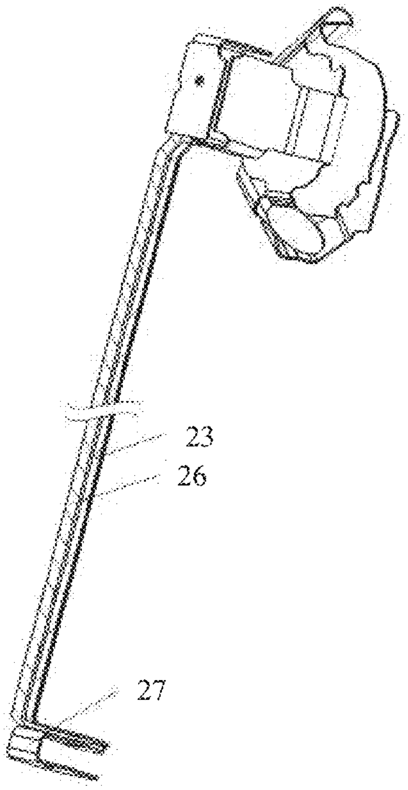
Figure 17B:
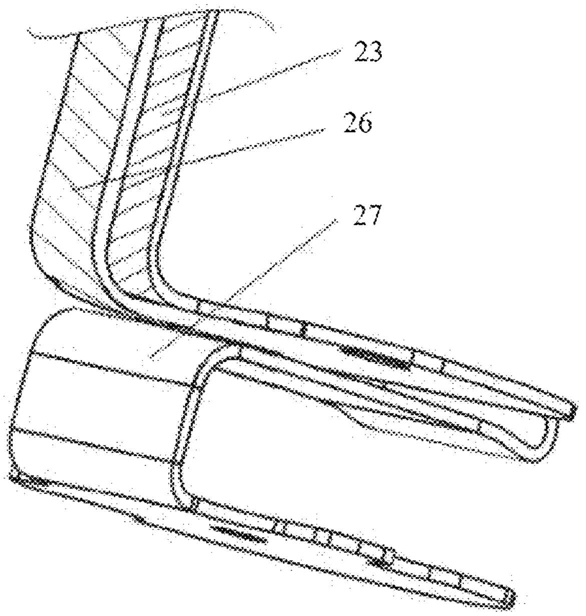
Figure 18:
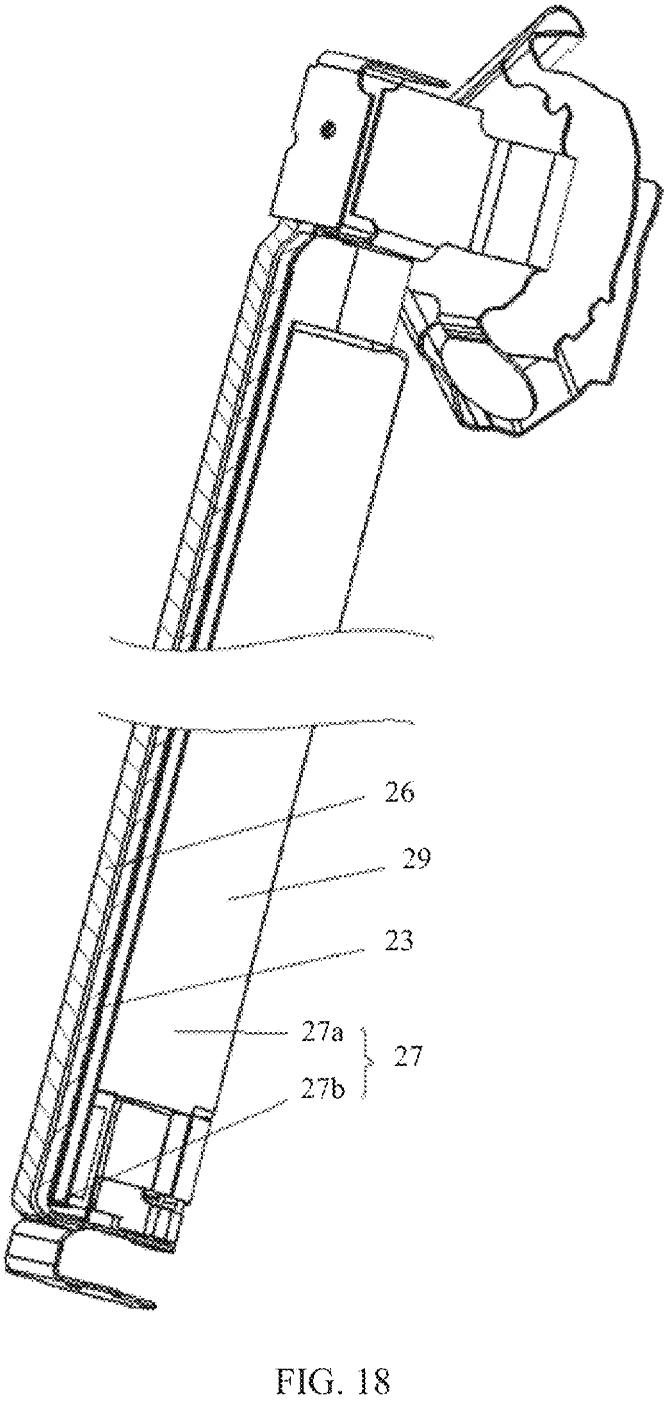
Figure 19:
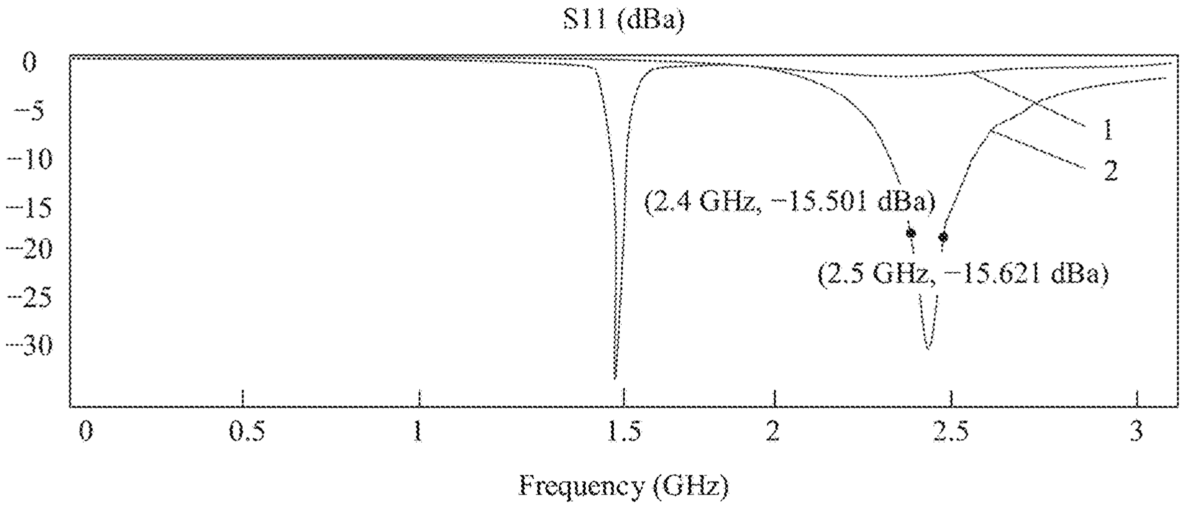
Figure 20:
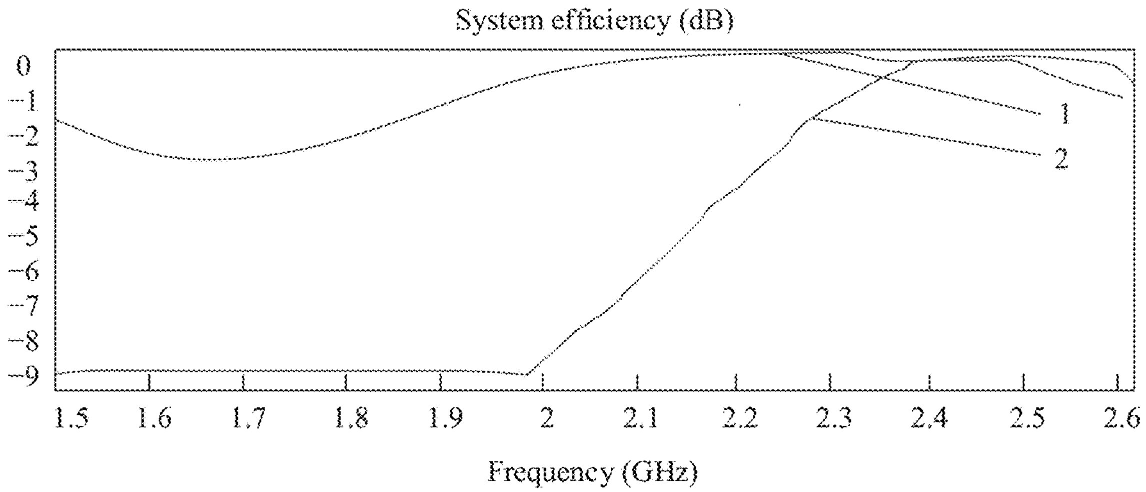
Figure 21:
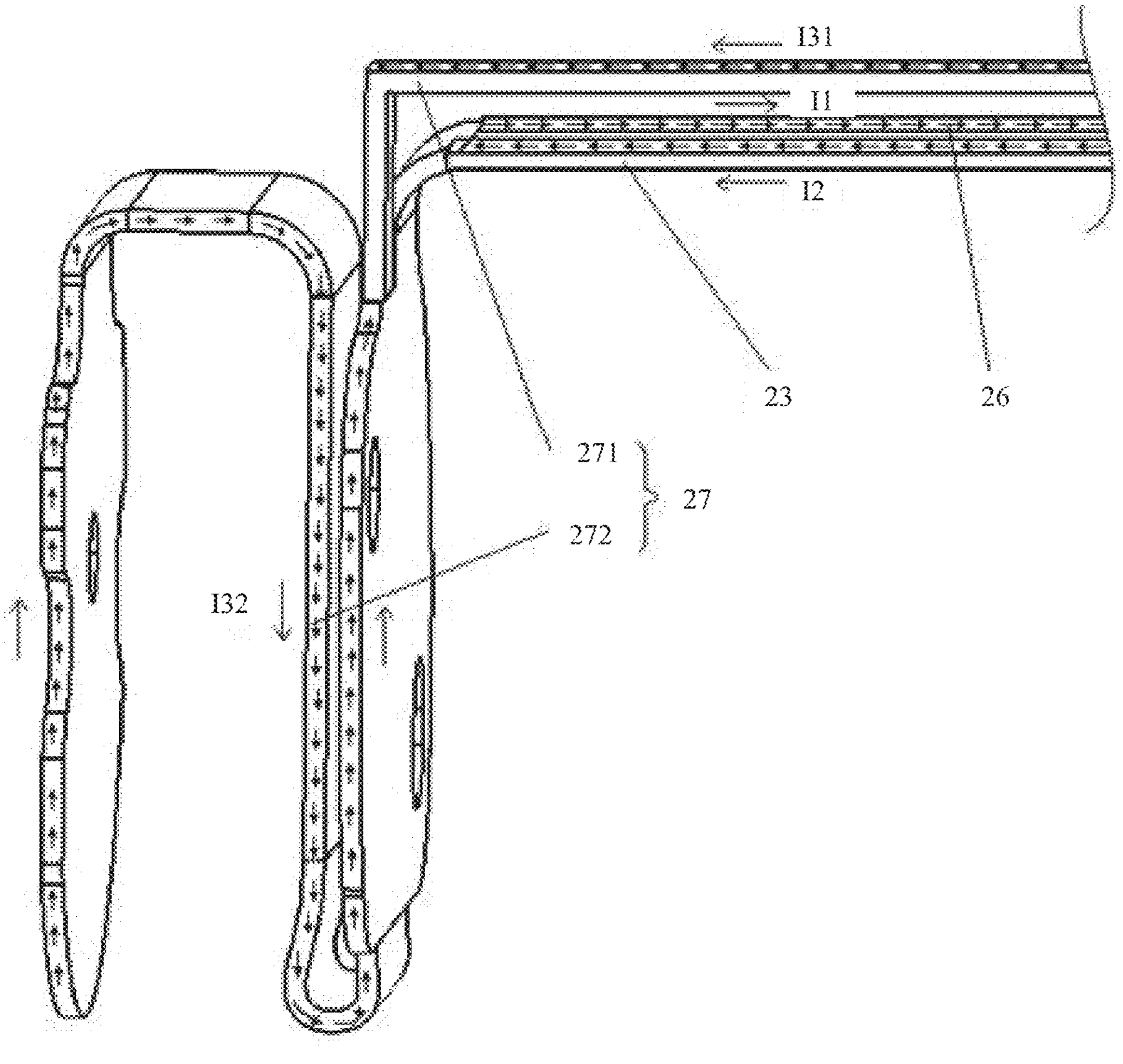
Figure 22A:
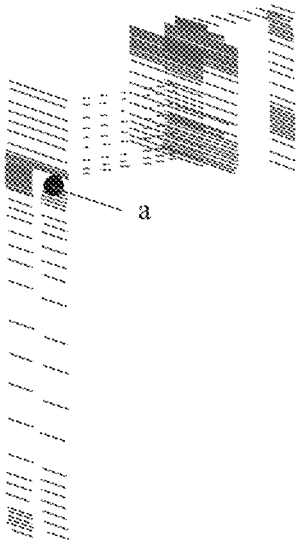
Figure 22B:
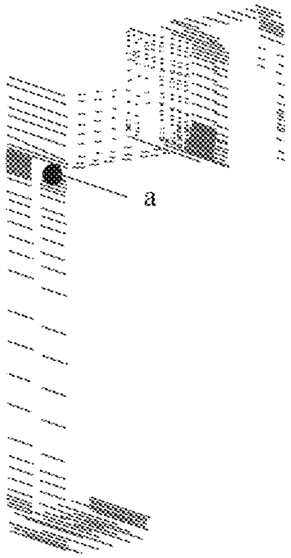
Figure 22C:
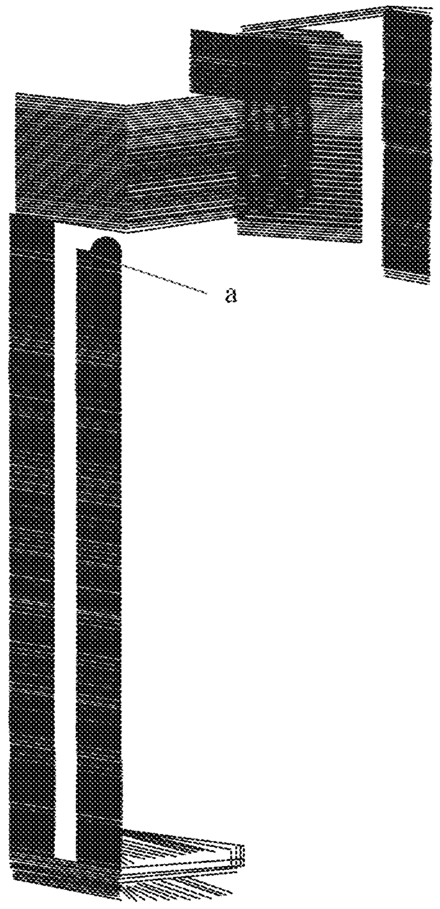
Figure 23:
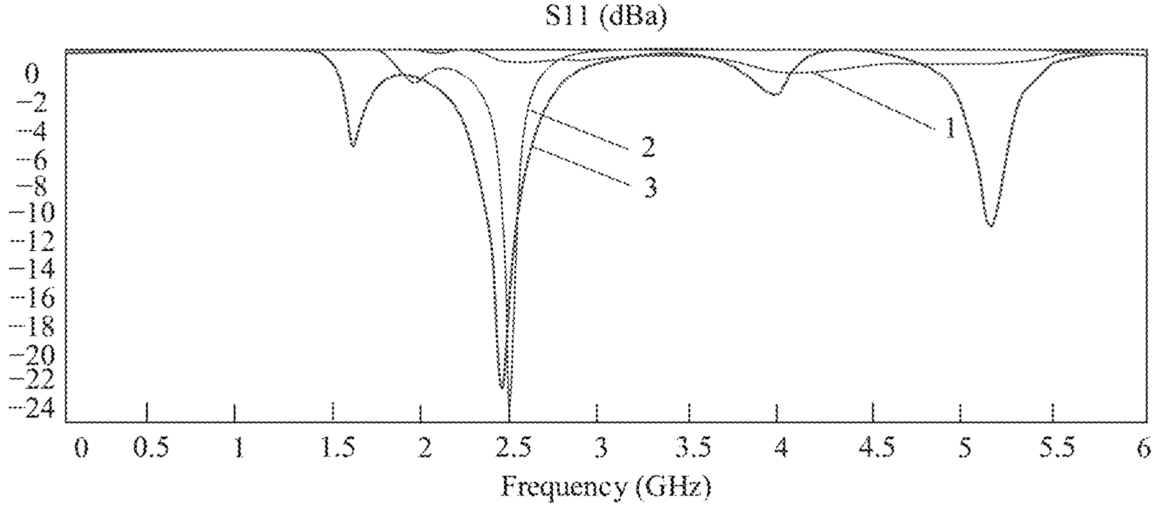
Figure 24:
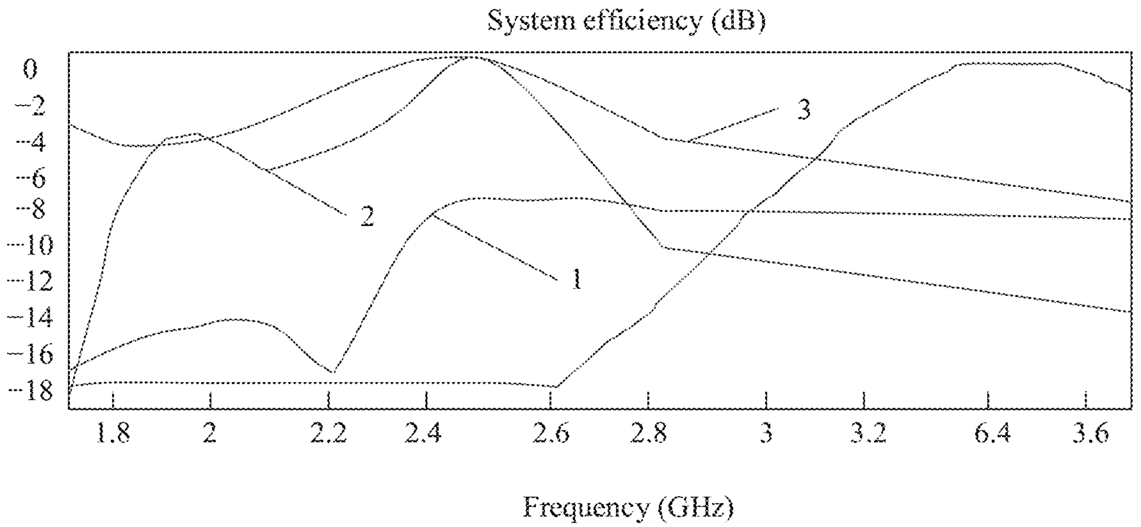

FIG. **6*a*** is a schematic diagram of a position of a third connecting portion in a Bluetooth earphone according to an embodiment of this application;

FIG. **6*b*** is a schematic diagram of a position of a third connecting portion in a Bluetooth earphone according to an embodiment of this application;

FIG. 7 is a schematic diagram of a reflection coefficient S11 curve of an antenna architecture in a Bluetooth earphone according to an embodiment of this application;

FIG. 8 is a schematic diagram of a system efficiency curve of an antenna architecture in a Bluetooth earphone according to an embodiment of this application;

FIG. 9*a* is a schematic diagram of a position of a third connecting portion in a Bluetooth earphone according to an embodiment of this application;

FIG. 9*b* is a schematic diagram of a position of a third connecting portion in a Bluetooth earphone according to an embodiment of this application;

FIG. 9*c* is a schematic diagram of a position of a third connecting portion in a Bluetooth earphone according to an embodiment of this application;

FIG. 10 is a schematic diagram of a reflection coefficient S11 curve of an antenna architecture in a Bluetooth earphone according to an embodiment of this application;

FIG. 11 is a schematic diagram of a system efficiency curve of an antenna architecture in a Bluetooth earphone according to an embodiment of this application;

FIG. 12 is a schematic diagram of a position relationship between a projection of a third connecting portion on a plane on which an FPC is located in a vertical direction of the plane on which the FPC is located and an antenna radiator in a Bluetooth earphone according to an embodiment of this application;

FIG. 13 is a schematic diagram of a position relationship between a projection of a third connecting portion on a plane on which an FPC is located in a vertical direction of the plane on which the FPC is located and an antenna radiator in a Bluetooth earphone according to an embodiment of this application;

FIG. 14 is a schematic diagram of a position relationship between a projection of a third connecting portion on a plane on which an FPC is located in a vertical direction of the plane on which the FPC is located and an antenna radiator in a Bluetooth earphone according to an embodiment of this application;

FIG. 15 is a schematic diagram of a position relationship between a projection of a third connecting portion on a plane on which an FPC is located in a vertical direction of the plane on which the FPC is located and an antenna radiator in a Bluetooth earphone according to an embodiment of this application;

FIG. 16 is a schematic diagram of a position relationship between a projection of a third connecting portion on a plane on which an FPC is located in a vertical direction of the plane on which the FPC is located and an antenna radiator in a Bluetooth earphone according to an embodiment of this application;

FIG. 17*a* is a schematic diagram of a position of a third connecting portion in a Bluetooth earphone according to an embodiment of this application;

FIG. 17*b* is a schematic diagram of a position of a third connecting portion in a Bluetooth earphone according to an embodiment of this application;

FIG. 18 is a schematic diagram of a position of a third connecting portion in a Bluetooth earphone according to an embodiment of this application;

FIG. 19 is a schematic diagram of a reflection coefficient S11 curve of an antenna architecture in a Bluetooth earphone according to an embodiment of this application;

FIG. 20 is a schematic diagram of a system efficiency curve of an antenna architecture in a Bluetooth earphone according to an embodiment of this application;

FIG. 21 is a schematic diagram of directions of a current on a second connecting portion, a current on an antenna radiator, and a parasitic current on a third connecting portion in a Bluetooth earphone according to an embodiment of this application;

FIG. 22*a* is a schematic diagram of distribution of a current on a signal processing component in a Bluetooth earphone according to an embodiment of this application;

FIG. 22*b* is a schematic diagram of distribution of a current on a signal processing component in a Bluetooth earphone according to an embodiment of this application;

FIG. 22*c* is a schematic diagram of distribution of a current on a signal processing component in a Bluetooth earphone according to an embodiment of this application;

FIG. 23 is a schematic diagram of a reflection coefficient S11 curve of each of an antenna architecture in a Bluetooth earphone and an antenna architecture in a conventional Bluetooth earphone according to an embodiment of this application; and FIG. 24 is a schematic diagram of a system efficiency curve of each of an antenna architecture in a Bluetooth earphone and an antenna architecture in a conventional Bluetooth earphone according to an embodiment of this application.

DESCRIPTION OF EMBODIMENTS

Figure 1:
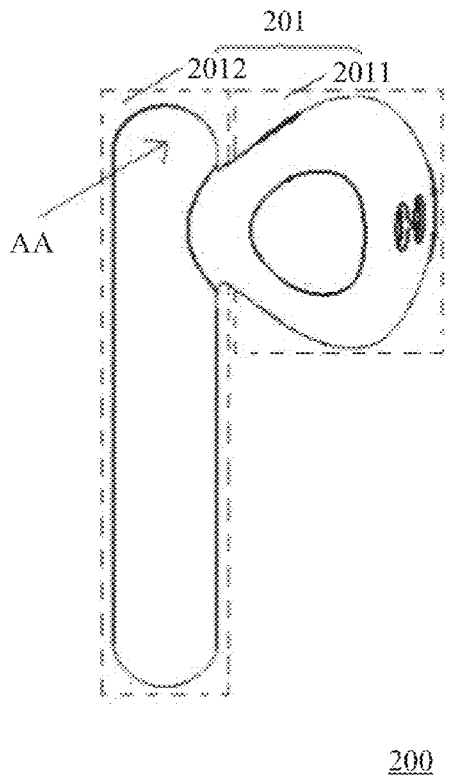
FIG. 1 is a schematic diagram of a structure of a Bluetooth earphone.
Figure 2:
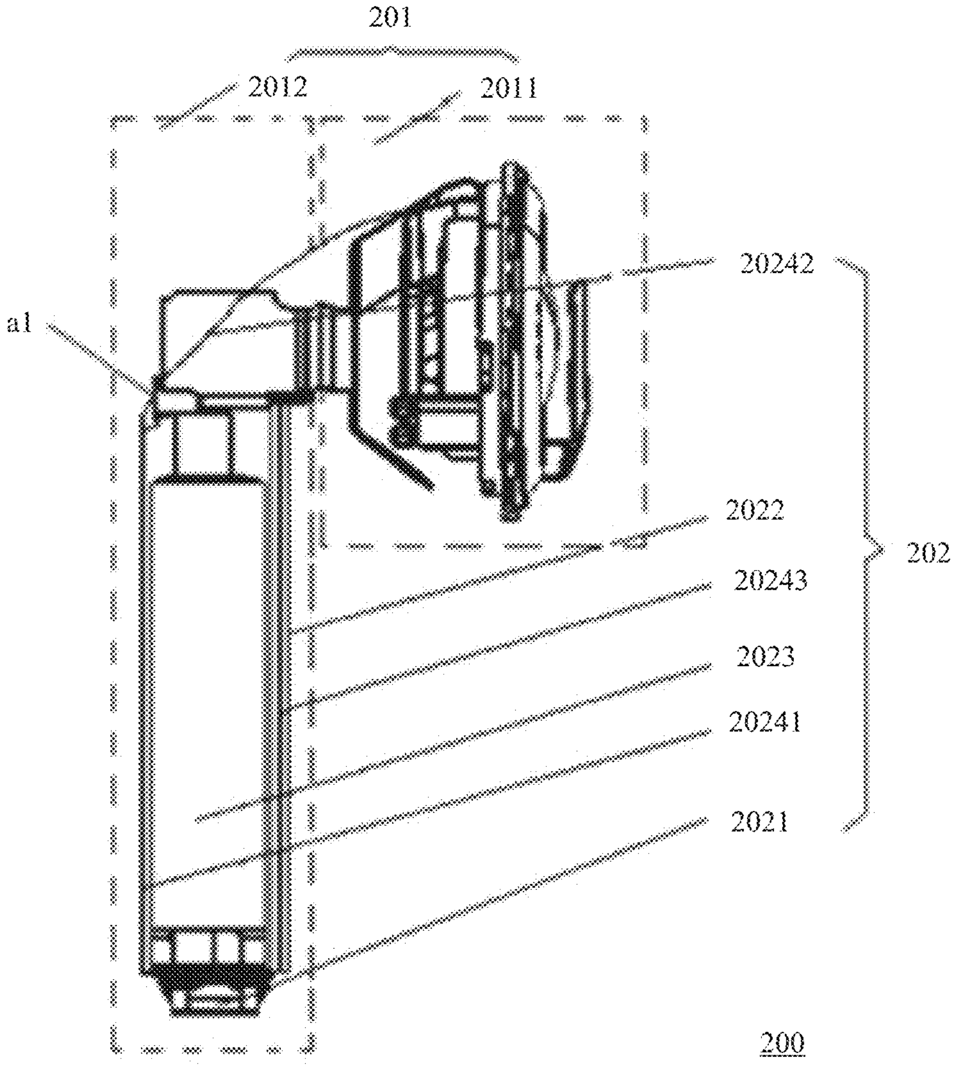
FIG. 2 is a schematic diagram of a structure of a signal processing component in the Bluetooth earphone shown in FIG. 1.

FIG. 1 is a schematic diagram of a structure of a Bluetooth earphone, and FIG. 2 is a schematic diagram of a structure of a signal processing component 202 in the Bluetooth earphone 200 shown in FIG. 1. As shown in FIG. 1 and FIG. 2, the Bluetooth earphone 200 includes an earphone housing 201 and the signal processing component 202. The earphone housing 201 has a cavity. The signal processing component 202 is located in the cavity. The earphone housing 201 includes an earbud portion 2011 and an earphone handle portion 2012.

As shown in FIG. 2, the signal processing component 202 includes a microphone 2021, a flexible printed circuit (flexible printed circuit, FPC) 2022, and a battery 2023. One part of the FPC 2022 is disposed on the earphone handle portion 2012, vertically extends, and is closely adjacent to the battery. The remaining parts of the FPC 2022 are disposed on the earbud portion 2011. The microphone 2021 is disposed at a bottom end of the earphone handle portion 2012, and a ground cable 20243 disposed on the FPC 2022 on the earphone handle portion 2012 extends to the bottom end of the earphone handle portion 2012, to implement an electrical connection to a ground terminal of the microphone 2021, so as to ensure that the microphone 2021 can work normally. A current on the ground cable 20243 on the FPC 2022 on the earphone handle portion flows from a top end of the earphone handle portion 2012 to a ground point on the FPC 2022. The battery 2023 is disposed on the earphone handle portion 2012, and the battery 2023 supplies power to the microphone 2021.

As shown in FIG. 2, the signal processing component 202 further includes an antenna architecture in the Bluetooth earphone 200. An inverted F antenna (inverted-F antenna IFA) is usually used for the antenna architecture. The antenna architecture includes an antenna radiator 20241 in a strip shape and a transmission cable (cable) 20242 connected to one end of the antenna radiator 20241. The antenna radiator 20241 is located on the earphone handle portion 2012, vertically extends, and is closely adjacent to the battery 2023. A current on the antenna radiator 20241 flows from a connection point (namely, a feed point al) between the antenna radiator 20241 and the transmission cable 20242 to the bottom end of the earphone handle portion 2012. The transmission cable 20242 extends from the top end of the earphone handle portion 2012 to the earbud portion 2011, and the transmission cable 20242 is configured to transmit a radio frequency signal.

The antenna radiator 20241 and the ground cable 20243 disposed on the FPC 2022 on the earphone handle portion 2012 are usually parallel to each other and equal in length. In this case, the current on the antenna radiator 20241 is equal in intensity and opposite in phase to the current on the ground cable 20243 disposed on the FPC 2022 on the earphone handle portion 2012, and consequently the current on the ground cable 20243 disposed on the FPC 2022 on the earphone handle portion 2012 offsets the current on the antenna radiator 20241. In this case, the IFA cannot radiate, and consequently the Bluetooth earphone 200 cannot work. In addition, there are relatively high costs of independently disposing the IFA.

Based on the structure of the Bluetooth earphone 200 shown in FIG. 1 and FIG. 2, as shown in FIG. 2, in addition to the antenna architecture, the Bluetooth earphone 200 may use a ceramic antenna. The ceramic antenna may be usually disposed at the top end AA of the earphone handle portion 3012. The ceramic antenna requires a large antenna clearance region, and therefore the Bluetooth earphone 200 cannot meet a requirement of compact layout, it is difficult to meet a requirement that there is no antenna clearance region or there is a small antenna clearance region, and antenna performance is deteriorated due to an insufficient antenna clearance region.

To resolve the foregoing problem, this application provides a Bluetooth earphone. In this way, a requirement of compact layout of the Bluetooth earphone can be met, there are features of low costs and space saving, and a requirement that there is no antenna clearance region or there is a small antenna clearance region can be further met, to improve antenna performance of the Bluetooth earphone.

Technical solutions of the Bluetooth earphone in this application are described below with reference to the accompanying drawings in the embodiments of this application.

Figure 3:
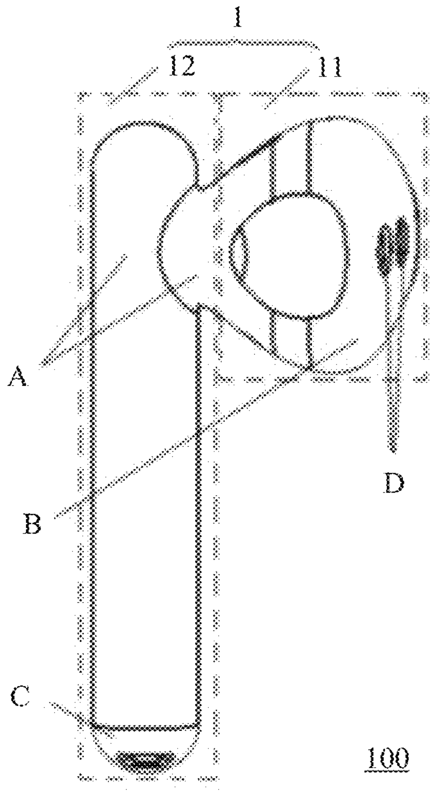
FIG. 3 is a schematic diagram of a structure of a Bluetooth earphone according to an embodiment of this application.

FIG. 3 is a schematic diagram of a structure of a Bluetooth earphone according to an embodiment of this application. As shown in FIG. 3, the Bluetooth earphone 100 in this application may include an earphone housing 1 and a signal processing component 2. The earphone housing 1 has a cavity. The signal processing component 2 is located in the cavity. The earphone housing 1 is configured to fasten and protect the signal processing component 2.

The earphone housing 1 includes an earbud portion 11 and an earphone handle portion 12. The earbud portion 11 is configured to be partially inserted into an ear of a user. The earphone handle portion 12 is configured to: facilitate holding by the user to implement wearing, and facilitate touch by the user to implement a corresponding function. When the user wears the Bluetooth earphone 100, a part of the earbud portion 11 is inserted into the ear of the user, and the earphone handle portion 12 is located outside the ear of the user.

It should be noted that in addition to a division manner in which a connecting portion between the earbud portion 11 and the earphone handle portion 12 is used as the earphone handle portion 12 in FIG. 3, in this application, the connecting portion between the earbud portion 11 and the earphone handle portion 12 may be used as the earbud portion 11, to obtain the earbud portion 11 and the earphone handle portion 12 through division.

The earphone housing 1 may be integrally formed, to avoid a case in which a component in the Bluetooth earphone 100 is damaged or lost when the Bluetooth earphone 100 accidentally falls off. Alternatively, the earphone housing 1 may include a plurality of parts in a detachable connection such as a snap-fit connection or a threaded connection, to facilitate subsequent repair or maintenance of the Bluetooth earphone 100. Alternatively, the earphone housing 1 may include a plurality of parts in a non-detachable connection such as an adhesive connection, to reduce a risk that the Bluetooth earphone 100 accidentally falls off, so that the Bluetooth earphone 100 is more reliable.

For ease of description, with reference to FIG. 3, a plurality of parts included in the earphone housing are illustrated by using an example.

As shown in FIG. 3, the earphone housing 1 may include three parts: a main housing A, a bottom housing B, and a side housing C. One part of the main housing A is located on the earphone handle portion 12 of the Bluetooth earphone 100, and the other part of the main housing A is located on the earbud portion 11 of the Bluetooth earphone 100. The main housing A forms a first opening at a bottom end of the earphone handle portion 12 of the Bluetooth earphone 100, and forms a second opening on the earbud portion 11 of the Bluetooth earphone 100. The signal processing component 2 may be inserted into the main housing A from the first opening or the second opening. The bottom housing B is located at the bottom end of the earphone handle portion 12 of the Bluetooth earphone 100, and is permanently connected to the main housing A. The bottom housing B is mounted in the first opening. The side housing C is located on the earbud portion 11 of the Bluetooth earphone 100, and is permanently connected to the main housing A. The side housing C is mounted in the second opening.

In this application, a connection between the main housing A and the bottom housing B and a connection between the side housing C and the main housing A may be implemented by using a detachable connection or a non-detachable connection. This is not limited in this application.

In addition, one or more sound output holes D are disposed on the side housing C (in FIG. 3, two sound output holes are used as an example for illustration), so that sound inside the earphone housing 1 can be transmitted to outside of the earphone housing 1 through the sound output holes D. A shape, position, and quantity of sound output holes D are not limited in this application. For ease of description, in FIG. 3, two circular sound output holes D are used as an example for illustration.

Figure 4:
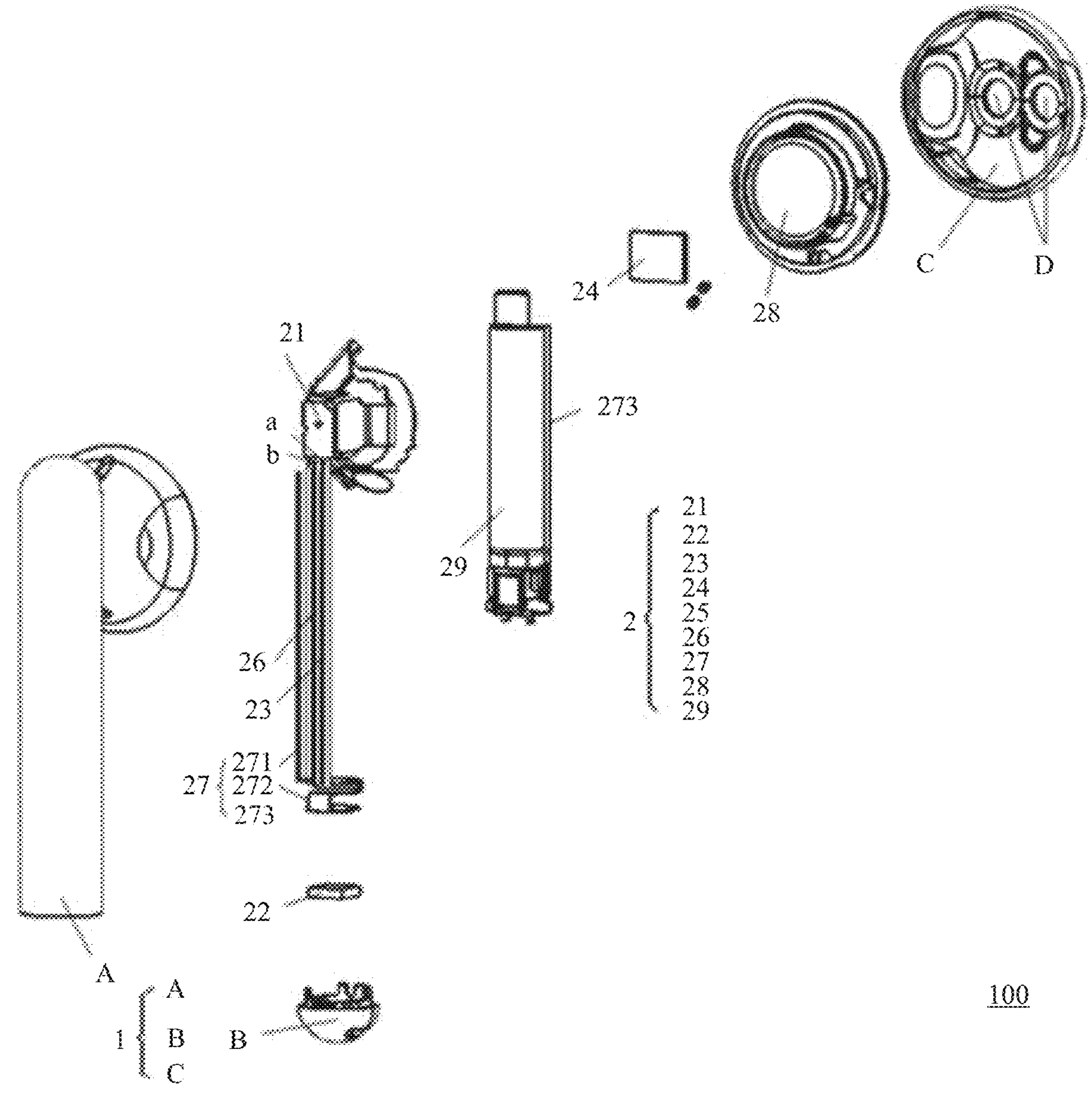
FIG. 4 is an exploded schematic diagram of a Bluetooth earphone according to an embodiment of this application.
Figure 5:
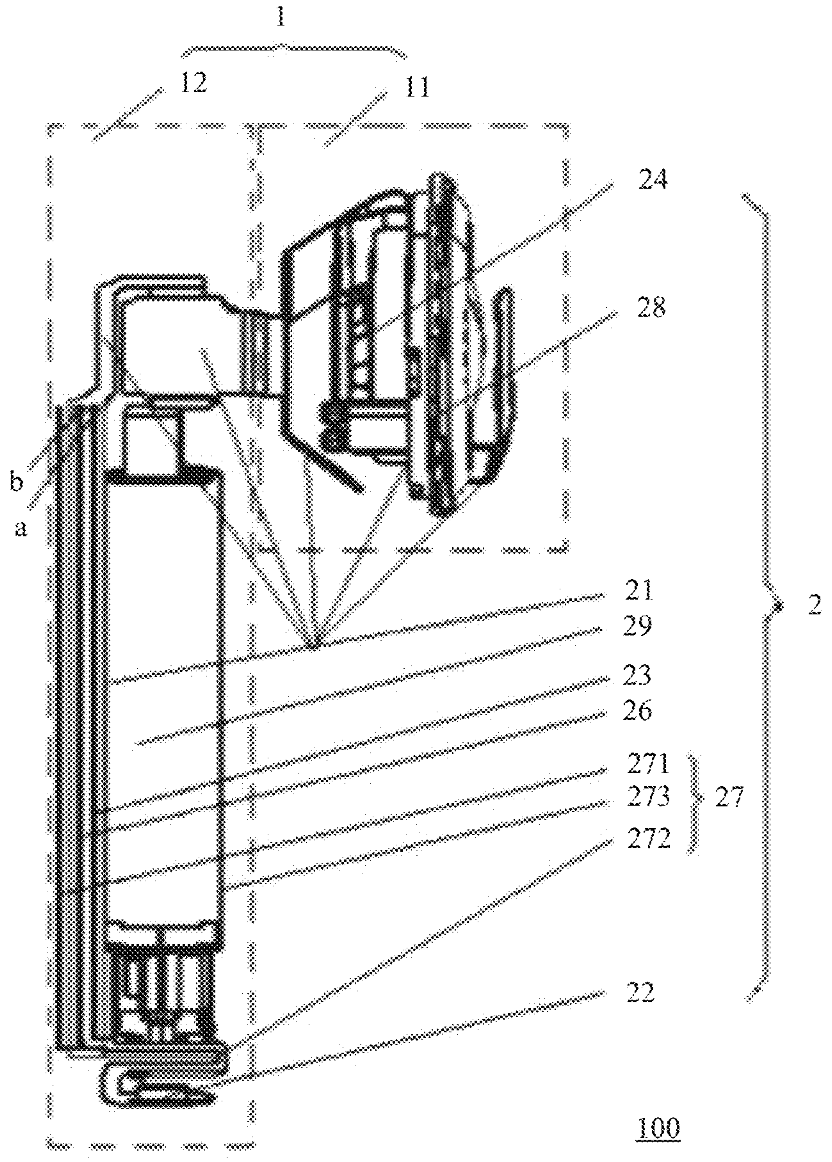
FIG. 5 is a schematic diagram of a structure of a signal processing component in a Bluetooth earphone according to an embodiment of this application.

FIG. 4 is an exploded schematic diagram of the Bluetooth earphone 100 shown in FIG. 3, and FIG. 5 is a schematic diagram of a structure of the signal processing component 2 in the Bluetooth earphone 100 shown in FIG. 3. As shown in FIG. 4 and FIG. 5, the signal processing component 2 may include a flexible printed circuit FPC 21, a microphone 22, an antenna radiator 23, a control module 24, a first connecting portion 25 (not shown in FIG. 4 and FIG. 5), a second connecting portion 26, and a third connecting portion 27.

The FPC 21 is disposed on the earphone handle portion 12, and a part of the FPC 21 extends to the earbud portion 11 along a top end of the earphone handle portion 12. In other words, the FPC 21 extends from the bottom end of the earphone handle portion 12 to the earbud portion 11 through the top end of the earphone handle portion 12. The FPC 21 may form one or more bent structures on the earbud portion 11 and the earphone handle portion 12. For example, the earphone housing 1 may be of a structure of "r". The FPC 21 is configured to accommodate or fasten an element in the Bluetooth earphone 100.

The control module 24 may be fastened to the FPC 21 through welding, gluing, or the like. The control module 24 is configured to process a radio frequency signal. A specific implementation form of the control module 24 is not limited in this application. For example, the control module 24 may be a system on chip (system on chip, SOC). Usually, the control module 24 may include a radio frequency (RF) circuit. The radio frequency circuit is configured to modulate or demodulate a radio frequency signal. A position of the control module 24 is not limited in this application. Optionally, the control module 24 is located on the earbud portion 11.

The microphone 22 is disposed at the bottom end of the earphone handle portion 12. A type and quantity of microphones 22 are not limited in this application. When the user wears the Bluetooth earphone 100, the microphone 22 may receive a sound signal from the user, and a signal end of the microphone 22 is electrically connected to the control module 24, may convert the sound signal into an electrical signal, and transmit the electrical signal to the control module 24, so that the control module 24 processes the electrical signal into a radio frequency signal. In this way, the microphone 22 can work normally.

To facilitate obtaining of the sound signal from the user, optionally, the microphone 22 may be disposed on a side that is of the FPC 21 and that is far away from the earphone handle portion 12, to help the microphone 22 obtain a sound signal from outside of the Bluetooth earphone 100. In addition, the microphone 22 may be mounted on the FPC 21 by using a fastener, so that the microphone 22 is coupled to the control module 24.

In addition, with continued reference to FIG. 4 and FIG. 5, in this application, the signal processing component 2 may further include a speaker 28 and a battery 29.

The speaker 28 is disposed on the earbud portion 11. A type, quantity, and position of speakers 28 are not limited in this application. When the user wears the Bluetooth earphone 100, a receiver may receive, by using an electrical connection to the control module 24, an electrical signal sent by the control module 24. The receiver then converts the electrical signal into a sound signal, and outputs the sound signal to the outside of the Bluetooth earphone 100, so that the receiver can work normally.

To help the user hear the sound signal clearly, optionally, the speaker 28 may be disposed on a side that is of the FPC 21 and that is far away from the earbud portion 11, to facilitate transmission of the sound signal formed by the receiver to the outside of the Bluetooth earphone 100. In addition, the speaker 28 may be mounted on the FPC 21 by using a fastener, so that the speaker 28 is coupled to the control module 24.

The battery 26 is disposed on the earphone handle portion 12. A type, quantity, shape, and position of batteries 29 are not limited in this application. Optionally, the battery 29 may be in a strip shape, to be better accommodated in the earphone housing 1. A power supply end of the battery 29 is electrically connected to a power supply end of the control module 24, a power supply end of the speaker 28, and a power supply end of the microphone 22, so that the battery 29 supplies power to the Bluetooth earphone 100. In addition, the power supply end of the battery 29 may be located at the top end of the earphone handle portion 12, or may be located at the bottom end of the earphone handle portion 12. This is not limited in this application. For ease of description, in FIG. 4 and FIG. 5, an example in which the battery 29 is in the strip shape and the power supply end of the battery 29 is located at the top end of the earphone handle portion 12 is used for illustration.

An antenna architecture in the Bluetooth earphone 100 in this application may include the antenna radiator 23, the first connecting portion 25, the second connecting portion 26, and the third connecting portion 27. Optionally, a type of the antenna architecture in the Bluetooth earphone 100 in this application may include any one of a monopole antenna, an inverted F antenna IFA, and a planar inverted F antenna (planar inverted-F antenna. PIFA). It should be noted that when the type of the antenna architecture in the Bluetooth earphone 100 in this application is a PIFA, the antenna radiator 23 further needs to be connected to the second connecting portion 26.

The antenna radiator 23 may be disposed on the FPC 21 by using a manufacturing process such as insert molding (insert molding), metal coating, a flexible printed circuit (namely, a steel sheet), or laser direct structuring (laser direct structuring, LDS), and the antenna radiator 23 is located on the earphone handle portion 12. A type of the antenna radiator 23 is not limited in this application.

A length of the antenna radiator 23 is ¼ of a wavelength corresponding to an operating frequency band of the antenna radiator 23. The antenna radiator 23 may normally communicate at one or more operating frequency bands. Therefore, in this application, any operating frequency band may be selected from the operating frequency band at which the antenna radiator 23 normally communicates, any frequency in the operating frequency band may be selected, and the frequency is introduced into a formula $c=f*\lambda$, to calculate the wavelength. Herein, f is the frequency in a unit of hertz (Hz), $\lambda$ is the wavelength in a unit of meter (m), and c is a speed of light, and c=3×10^8 meters per Hz (m/Hz). Therefore, in this application, it may be set that the length of the antenna radiator 23 is ¼ of the wavelength.

It should be noted that due to impact of a medium around a path, an actual physical length of the first connecting portion 25 is usually less than ¼ of the wavelength, and an actual physical length of the antenna radiator 23 is usually less than ¼ of the wavelength The antenna radiator 23 is electrically connected to the control module 24 by using a feed point a on the FPC 21, may receive a radio frequency signal sent by the control module 24, to radiate the radio frequency signal by using the antenna radiator 23, and may further send a radio frequency signal to the control module 24, so that that control module 24 processes the radio frequency signal. In this way, the antenna radiator 23 can communicate normally. A person skilled in the art may understand that the feed point a is a connection point for mutual transmission of energy between the antenna radiator 23 and a feeder. Usually, the feed point a may be welded to the FPC 21 by using metal such as a copper sheet. A position of the feed point a is not limited in this application. Optionally, the feed point a is located on the earphone handle portion 12.

The first connecting portion 25 may be disposed on the FPC 21 by using a manufacturing process such as insert molding, metal coating, a flexible printed circuit (namely, a steel sheet), or LDS, and the first connecting portion 25 is located on the earbud portion 11. A position and form of the first connecting portion 25 are not limited in this application. The first connecting portion 25 is a main ground of the Bluetooth earphone 100, and a ground terminal of the control module 24, the first connecting portion 25, and a ground point b on the FPC 21 share a ground. In addition, a length of the first connecting portion 25 is ¼ of the wavelength, and the first connecting portion 25 is configured to form a radiator of the antenna radiator 23, so that a total length of the antenna radiator 23 and a first ground cable meet a requirement that the total length is ½ of the wavelength, to implement a communication process of the Bluetooth earphone 100.

The ground point b is located on the earphone handle portion 12, and the ground point b is at a preset distance from the feed point a. The preset distance may be set based on a design rule of an antenna. This is not limited in this application. A position of the ground point b is not limited in this application. Optionally, the ground point b is located on the earphone handle portion 12. For ease of description, in FIG. 5, an example in which the ground point b is located outside the feed point a is used for illustration.

The second connecting portion 26 may be disposed by using a manufacturing process such as insert molding, metal coating, a flexible printed circuit (namely, a steel sheet), or LDS, and the second connecting portion 26 is located on the earphone handle portion 12. A position and form of the second connecting portion 26 are not limited in this application. The ground point b, the first connecting portion 25, and the ground terminal of the control module 24 share a ground, and a ground terminal of the microphone 22 is electrically connected to the ground point b by using the second connecting portion 26. Therefore, in the Bluetooth earphone 100 in this application, the microphone 22 and the control module 24 may be connected to a same ground, to minimize interference caused due to sharing of a ground.

Optionally, the second connecting portion 26 may be disposed on the FPC 21. And then, both the antenna radiator 23 and the second connecting portion 26 are disposed on the FPC 21. Therefore, in comparison with the conventional Bluetooth earphone 200, space of the earphone handle portion in the Bluetooth earphone 100 is saved, a process of assembling the Bluetooth earphone 100 is simplified, layout costs are reduced, and a requirement of compact layout of the Bluetooth earphone 100 is met.

One or more third connecting portions 27 extend from at least one position other than the ground point b on the second connecting portion 26, and the third connecting portion 27 is located on the earphone handle portion 12. In other words, one or more third connecting portions 27 may extend from any position other than the ground point b on the second connecting portion 26. This is not limited in this application. For ease of description, in FIG. 5, three third connecting portions 27, namely, a connecting portion 271, a connecting portion 272, and a connecting portion 273, are used as an example for illustration.

In this application, a manufacturing process such as insert molding, metal coating, a flexible printed circuit (namely, a steel sheet), or LDS may be used for the third connecting portion 27. A position and form of the third connecting portion 27 are not limited in this application. A total length of the second connecting portion 26 and the third connecting portion 27 is greater than ¼ of the wavelength. A length of each of the second connecting portion 26 and the third connecting portion 27 is not limited in this application.

To further improve antenna performance, optionally, the total length of the second connecting portion 26 and the third connecting portion 27 is greater than ¼ of the wavelength, and is less than or equal to ½ of the wavelength. In addition, to further meet the requirement of compact layout of the Bluetooth earphone 100, optionally, the second connecting portion 26, the third connecting portion 27, and the antenna radiator 23 may be parallel to each other and equal in length.

In this application, a current on the second connecting portion 26 flows from the bottom end of the earphone handle portion 12 to the ground point b, and a current on the antenna radiator 23 flows from the feed point a to the bottom end of the earphone handle portion 12, so that the current on the second connecting portion 26 offsets the current on the antenna radiator 23. The third connecting portion 27 is connected to the second connecting portion 26, and the total length of the second connecting portion 26 and the third connecting portion 27 is greater than ¼ of the wavelength. In addition, a parasitic current on the third connecting portion 27 flows from a position at which the third connecting portion 27 is connected to the second connecting portion 26 to an end of the third connecting portion 27, and the current on the antenna radiator 23 and the parasitic current on the third connecting portion 27 are not in opposite directions. Therefore, the parasitic current on the third connecting portion 27 does not offset the current on the antenna radiator 23, but instead enhances the current on the antenna radiator 23. In this way, the third connecting portion 27 becomes a parasitic element of the antenna radiator 23, to effectively improve antenna performance of the Bluetooth earphone 100, and ensure a communication effect of the Bluetooth earphone 100.

There are a plurality of implementations in which the current on the antenna radiator 23 and the parasitic current on the third connecting portion 27 are not in opposite directions. For example, the parasitic current on the third connecting portion 27 and the current on the antenna radiator 23 may be in a same direction. Alternatively, there may be an acute angle between a direction of the parasitic current on the third connecting portion 27 and a direction of the current on the antenna radiator 23. Alternatively, the parasitic current on the third connecting portion 27 may tortuously flow from the position at which the third connecting portion 27 is connected to the second connecting portion 26 to the end of the third connecting portion 27.

According to the Bluetooth earphone provided in this application, it is set that the total length of the second connecting portion and the third connecting portion is greater than ¼ of the wavelength corresponding to the operating frequency band of the antenna radiator, the current on the antenna radiator flows from the feed point to the bottom end of the earphone handle portion, the third connecting portion is connected to the second connecting portion, the current on the second connecting portion flows from the bottom end of the earphone handle portion to the ground point, the parasitic current on the third connecting portion flows from the position at which the third connecting portion is connected to the second connecting portion to the end of the third connecting portion along a body of the third connecting portion, and the current on the antenna radiator and the parasitic current on the third connecting portion are not in opposite directions, so that the third connecting portion becomes a parasitic element of the antenna radiator. In this way, performance of the antenna radiator is improved, a requirement of compact layout of the Bluetooth earphone is met, a requirement that there is no antenna clearance region or there is a small antenna clearance region is met, and it is ensured that the Bluetooth earphone has good antenna performance. In addition, both the antenna radiator and the second connecting portion are disposed on the FPC. Therefore, space of the Bluetooth earphone is saved, complexity of an assembly process is reduced, layout costs are reduced, and the requirement of compact layout of the Bluetooth earphone is further met.

Based on the embodiments shown in FIG. 3 to FIG. 5, any third connecting portion 27 in this application may be implemented in a plurality of manners. A specific structure of any third connecting portion 27 is described below in detail by using Embodiment 1, Embodiment 2, and Embodiment 3.

Embodiment 1

In Embodiment 1, any third connecting portion 27 may include a connecting portion that extends from one or more positions that are on the second connecting portion 26 and that are close to the bottom end of the earphone handle portion 12 to a direction close to the top end of the earphone handle portion 12. In this way, space of the earphone handle portion 12 is fully used, and compact layout of the Bluetooth earphone 100 is implemented.

A shape of the third connecting portion 27, a quantity of third connecting portions 27, the position at which the third connecting portion 27 is connected to the second connecting portion 26, and an angle between the third connecting portion 27 and the second connecting portion 26 are not limited in this application, provided that it is met that the total length of the second connecting portion 26 and the third connecting portion 27 is greater than ¼ of the wavelength and the current on the antenna radiator 23 and the parasitic current on the third connecting portion 27 are not in opposite directions. Optionally, the parasitic current on the third connecting portion 27 and the current on the antenna radiator 23 may be in a same direction, so that the third connecting portion 27 becomes a parasitic element of the antenna radiator 23, to improve performance of the antenna radiator 23.

To save space of the earphone housing 1, optionally, the third connecting portion 27 and the second connecting portion 26 form a U-shaped structure. In this way, both the second connecting portion 26 and the third connecting portion 27 are in a straight-line shape and are parallel to each other. Therefore, space of the Bluetooth earphone 100 is compact, and layout of the antenna architecture in the Bluetooth earphone 100 is further facilitated.

In this application, the third connecting portion 27 may be specifically located at a plurality of positions. Examples of specifically disposing the third connecting portion 27 are provided below by using two feasible implementations.

Figure 6A:
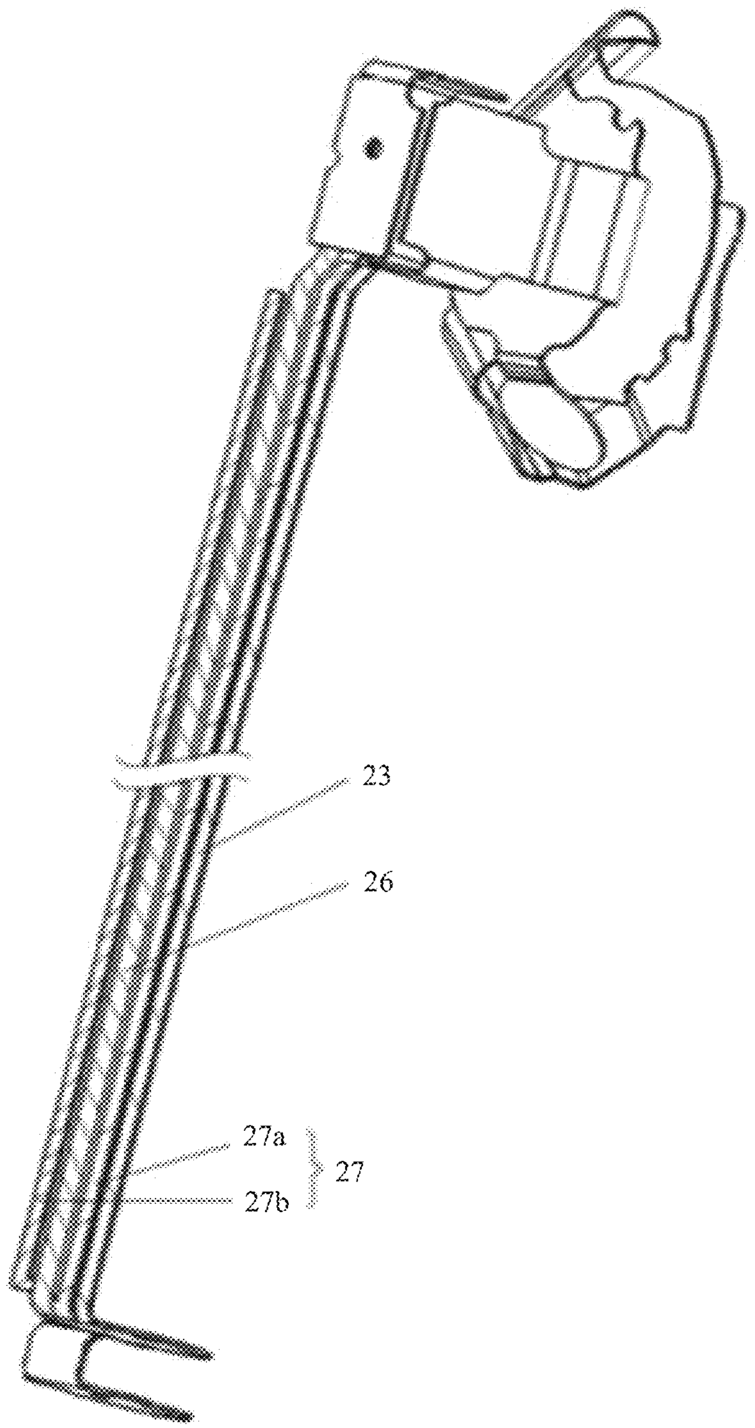
Figure 6B:
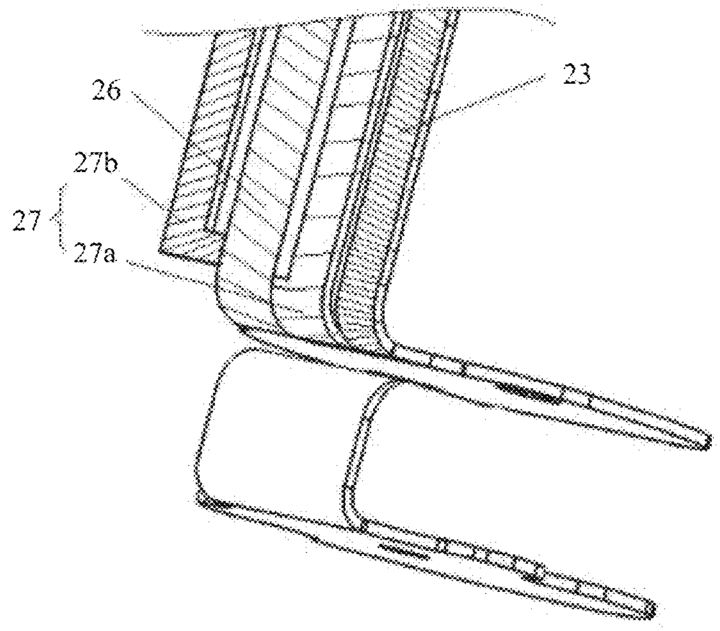

In a feasible implementation, as shown in FIG. 6*a* and FIG. 6*b*, the third connecting portion 27 may be disposed on the FPC 21 by using a manufacturing process such as insert molding, metal coating, a flexible printed circuit (namely, a steel sheet), or LDS. This process is simple and easy to perform, and space of the earphone handle portion 12 is saved, so that the Bluetooth earphone 100 meets the requirement of compact layout. For ease of description, in FIG. 6*a* and FIG. 6*b*, two third connecting portions 27, namely, a connecting portion 27*a* that extends from a position on the second connecting portion 26 and a connecting portion 27*b* that extends from another position on the second connecting portion 26, are used as an example for illustration. The connecting portion 27*a* is connected to an end of the second connecting portion 26, the connecting portion 27*b* is connected to a side edge of the second connecting portion 26, and the connecting portion 27*a*, the connecting portion 27*b*, the second connecting portion 26, and the antenna radiator 23 are parallel to each other.

It should be noted that in FIG. 6*a* and FIG. 6*b*, oblique lines on the connecting portion 27*a*, the connecting portion 27*b*, the second connecting portion 26, and the antenna radiator 23 are not cross-sectional lines respectively corresponding to the connecting portion 27*a*, the connecting portion 27*b*, the second connecting portion 26, and the antenna radiator 23, and are used to facilitate distinction between the connecting portion 27*a*, the connecting portion 27*b*, the second connecting portion 26, and the antenna radiator 23.

A specific position of the third connecting portion 27 on the FPC 21 is not limited in this application. Optionally, the third connecting portion 27 is closely adjacent to the antenna radiator 23, to ensure that the third connecting portion 27 serves as a parasitic element of the antenna radiator 23, so as to improve antenna performance.

A reflection coefficient S11 curve of the antenna architecture in the Bluetooth earphone 100 in this application is illustrated below with an assumption that the operating frequency band of the antenna radiator 23 ranges from 2.4 GHz to 2.5 GHz and with reference to FIG. 7. In FIG. 7, a horizontal coordinate is a frequency in a unit of megahertz (GHz), and a vertical coordinate is a reflection coefficient S11 in a unit of dBa. The reflection coefficient S11 is one of S parameters (namely, scattering parameters), and represents a return loss feature. A loss value in a unit of dB and an impedance feature of an antenna are usually obtained by using a network analyzer. This parameter represents a matching degree between the antenna and a front-end circuit. A larger reflection coefficient S11 value indicates a larger amount of energy reflected by the antenna, which indicates a lower matching degree of the antenna. For example, if an S11 value of an antenna A at a specific frequency is −1, and an S11 value of an antenna B at the same frequency is −3, the antenna B has a higher matching degree than the antenna A.

As shown in FIG. 7, a curve 1 is an S11 curve based on the structure of the Bluetooth earphone 200 shown in FIG. 1 and FIG. 2, and a curve 2 is an S11 curve based on the structure of the Bluetooth earphone 100 shown in FIG. 6*a* and FIG. 6*b*. In the curve 2, when an operating frequency of the antenna radiator 23 is 2.4 GHz, an S11 value is −7.863 dBa; and when the operating frequency of the antenna radiator 23 is 2.5 GHz, the S11 value is −13.226 dBa. The S11 value, in the curve 2, at the operating frequency band that ranges from 2.4 GHz to 2.5 GHz is smaller than an S11 value, in the curve 1, at the operating frequency band that ranges from 2.4 GHz to 2.5 GHz. Therefore, it may be learned that the antenna radiator 23 corresponding to the curve 2 has wider bandwidth and better antenna performance.

A system efficiency curve of the antenna architecture in the Bluetooth earphone 100 in this application is illustrated below with an assumption that the operating frequency band of the antenna radiator 23 ranges from 2.4 GHz to 2.5 GHz and with reference to FIG. 8. In FIG. 8, a horizontal coordinate is a frequency in a unit of megahertz (GHz), and a vertical coordinate is system efficiency in a unit of dB.

As shown in FIG. 8, a curve 1 is a system efficiency curve based on the structure of the Bluetooth earphone 200 shown in FIG. 1 and FIG. 2, and a curve 2 is a system efficiency curve based on the structure of the Bluetooth earphone 100 shown in FIG. 6*a* and FIG. 6*b*. A system efficiency value, in the curve 2, at the operating frequency band that ranges from 2.4 GHz to 2.5 GHz is smaller than a system efficiency value, in the curve 1, at the operating frequency band that ranges from 2.4 GHz to 2.5 GHz. Therefore, it may be learned that an antenna corresponding to the curve 2 has higher efficiency and better antenna performance.

In another feasible implementation, as shown in FIG. 9*a*. FIG. 9*b*, and FIG. 9*c*, the third connecting portion 27 may be disposed on the earphone handle portion 12, for example, on an inner wall or an outer wall of the earphone handle portion 12, by using a manufacturing process such as insert molding (insert molding), a flexible printed circuit (namely, a steel sheet), or LDS. In this way, the earphone handle portion 12 is fully used, and space of the earphone handle portion 12 is saved, so that the Bluetooth earphone 100 meets the requirement of compact layout. For ease of description, in FIG. 9*a*, FIG. 9*b*, and FIG. 9*c*, an example in which the third connecting portion 27 is a connecting portion that extends from a position on the second connecting portion 26 is used for illustration. The third connecting portion 27 is connected to an end of the second connecting portion 26, and the third connecting portion 27 and the second connecting portion 26 are parallel to each other. AY direction is a length direction of the FPC 21, an X direction is a vertical direction of a plane on which the FPC 21 is located, and the X direction is perpendicular to the Y direction.

It should be noted that in FIG. 9*a*, FIG. 9*b*, and FIG. 9*c*, oblique lines on the third connecting portion 27, the second connecting portion 26, and the antenna radiator 23 are not cross-sectional lines respectively corresponding to the third connecting portion 27, the second connecting portion 26, and the antenna radiator 23, and are used to facilitate distinction between the third connecting portion 27, the second connecting portion 26, and the antenna radiator 23.

A reflection coefficient S11 curve of the antenna architecture in the Bluetooth earphone 100 in this application is illustrated below with an assumption that the operating frequency band of the antenna radiator 23 ranges from 2.4 GHz to 2.5 GHz and with reference to FIG. 10. In FIG. 10, a horizontal coordinate is a frequency in a unit of megahertz (GHz), and a vertical coordinate is a reflection coefficient S11 in a unit of dBa.

As shown in FIG. 10, a curve 1 is an S11 curve based on the structure of the Bluetooth earphone 200 shown in FIG. 1 and FIG. 2, and a curve 2 is an S11 curve based on the structure of the Bluetooth earphone 100 shown in FIG. 9*a*, FIG. 9*b*, and FIG. 9*c*. In the curve 2, when an operating frequency of the antenna radiator 23 is 2.4 GHz, an S11 value is −13.953 dBa; and when the operating frequency of the antenna radiator 23 is 2.5 GHz, the S11 value is −9.2301 dBa. The S11 value, in the curve 2, at the operating frequency band that ranges from 2.4 GHz to 2.5 GHz is smaller than an S11 value, in the curve 1, at the operating frequency band that ranges from 2.4 GHz to 2.5 GHz. Therefore, it may be learned that an antenna corresponding to the curve 2 has wider bandwidth and better antenna performance.

A system efficiency curve of the antenna architecture in the Bluetooth earphone 100 in this application is illustrated below with an assumption that the operating frequency band of the antenna radiator 23 ranges from 2.4 GHz to 2.5 GHz and with reference to FIG. 11. In FIG. 11, a horizontal coordinate is a frequency in a unit of megahertz (GHz), and a vertical coordinate is system efficiency in a unit of dB.

As shown in FIG. 11, a curve 1 is a system efficiency curve based on the structure shown in FIG. 1 and FIG. 2, and a curve 2 is a system efficiency curve based on the structure shown in FIG. 9*a*, FIG. 9*b*, and FIG. 9*c*. A system efficiency value, in the curve 2, at the operating frequency band that ranges from 2.4 GHz to 2.5 GHz is smaller than a system efficiency value, in the curve 1, at the operating frequency band that ranges from 2.4 GHz to 2.5 GHz. Therefore, it may be learned that the antenna corresponding to the curve 2 has higher efficiency and better antenna performance.

As shown in FIG. 11, a curve 1 is a coefficient efficiency curve based on the structure shown in FIG. 1 and FIG. 2, and a curve 2 is a coefficient efficiency curve based on the structure shown in FIG. 9*a*. FIG. 9*b*, and FIG. 9*c*. A coefficient efficiency value, in the curve 2, at the operating frequency band that ranges from 2.4 GHz to 2.5 GHz is smaller than a coefficient efficiency value, in the curve 1, at the operating frequency band that ranges from 2.4 GHz to 2.5 GHz. Therefore, it may be learned that the antenna corresponding to the curve 2 has higher efficiency and better antenna performance.

A specific position of the third connecting portion 27 on the inner wall or the outer wall of the earphone handle portion 12 is not limited in this application. Examples of the specific position of the third connecting portion 27 on the inner wall or the outer wall of the earphone handle portion 12 are provided below by using three feasible embodiments and with reference to FIG. 12 to FIG. 16. For ease of description, it is not shown in FIG. 12 to FIG. 16 that the second connecting portion 26 is connected to the third connecting portion 27, and an example in which the antenna radiator 23 is on the FPC 21, and is located on a right side of the second connecting portion 26, and the second connecting portion 26, the third connecting portion 27, and the antenna radiator 23 are parallel to each other and equal in length is used for illustration.

In a feasible embodiment, optionally, there is an overlapping region between a projection of the third connecting portion 27 on the plane on which the FPC 21 is located in the vertical direction (namely, the X direction in FIG. 9*a*) of the plane on which the FPC 21 is located and the antenna radiator 23, so that the Bluetooth earphone 100 has good antenna performance. A size and position of the overlapping region are not limited in this application.

As shown in FIG. 12, the projection of the third connecting portion 27 on the plane on which the FPC 21 is located in the vertical direction of the plane on which the FPC 21 is located is completely mapped to the antenna radiator 23. As shown in FIG. 13, the projection of the third connecting portion 27 on the plane on which the FPC 21 is located in the vertical direction of the plane on which the FPC 21 is located is partially mapped to the antenna radiator 23.

In another feasible embodiment, optionally, a projection of the third connecting portion 27 on the plane on which the FPC 21 is located in the vertical direction (namely, the X direction in FIG. 9*a*) of the plane on which the FPC 21 is located is closely adjacent to the antenna radiator 23, so that the Bluetooth earphone 100 has relatively good antenna performance. A distance between the projection and the antenna radiator 23 is not limited in this application.

As shown in FIG. 14, the projection of the third connecting portion 27 on the plane on which the FPC 21 is located in the vertical direction of the plane on which the FPC 21 is located is mapped to a right side of the antenna radiator 23. As shown in FIG. 15, the projection of the third connecting portion 27 on the plane on which the FPC 21 is located in the vertical direction of the plane on which the FPC 21 is located is mapped between the second connecting portion 26 and the antenna radiator 23.

In another feasible embodiment, optionally, a projection of the third connecting portion 27 on the plane on which the FPC 21 is located in the vertical direction (namely, the X direction in FIG. 9*a*) of the plane on which the FPC 21 is located is far away from the antenna radiator 23, and is closely adjacent to the second connecting portion 26, so that the Bluetooth earphone 100 has relatively good antenna performance. A distance between the projection and the antenna radiator 23 is not limited in this application.

As shown in FIG. 16, a projection of the third connecting portion 27 on a plane on which the antenna radiator 23 is located in a vertical direction of the plane on which the antenna radiator 23 is located is mapped to a left side of the second connecting portion 26.

Embodiment 2

In Embodiment 2, as shown in FIG. 17*a* and FIG. 17*b*, optionally, any third connecting portion 27 may include a bent connecting portion that extends from one or more positions that are on the second connecting portion 26 and that are close to the bottom end of the earphone handle portion 12 to a direction close to the bottom end of the earphone handle portion 12. In this way, space at the bottom end of the earphone handle portion 12 is fully used, and compact layout of the Bluetooth earphone 100 is implemented. In addition, the parasitic current on the third connecting portion 27 tortuously flows from the position at which the third connecting portion 27 is connected to the second connecting portion 26 to the end of the third connecting portion 27 along the body of the third connecting portion 27, so that the third connecting portion 27 becomes a parasitic element of the antenna radiator 23, to improve performance of the antenna radiator 23.

A bending and deformation degree of the third connecting portion 27 is not limited in this application, provided that it is met that the total length of the second connecting portion 26 and the third connecting portion 27 is greater than ¼ of the wavelength. For ease of description, in FIG. 17*a* and FIG. 17*b*, an example in which the third connecting portion 27 extends from one position that is on the second connecting portion 26 and that is close to the bottom end of the earphone handle portion 12 is used for illustration.

It should be noted that in FIG. 17*a* and FIG. 17*b*, oblique lines on the third connecting portion 27, the second connecting portion 26, and the antenna radiator 23 are not cross-sectional lines respectively corresponding to the third connecting portion 27, the second connecting portion 26, and the antenna radiator 23, and are used to facilitate distinction between the third connecting portion 27, the second connecting portion 26, and the antenna radiator 23.

Embodiment 3

In Embodiment 3, as shown in FIG. 18, optionally, any third connecting portion 27 may include a metal outer wall of the battery 29 and a connecting portion connected to the metal outer wall of the battery 29 and at least one position that is on the second connecting portion 26 and that is close to the bottom end of the earphone handle portion 12. In this way, space occupied by the battery 29 is fully used, space of the earphone handle portion 12 is saved, and compact layout of the Bluetooth earphone 100 is implemented.

A thickness, a material, and an area of the metal outer wall are not limited in this application. For example, the metal outer wall may be made of copper foil. For ease of description, in FIG. 18, an example in which the third connecting portion 27 is an entire metal outer wall of the battery 29 is used for illustration.

It should be noted that in FIG. 18, oblique lines on the second connecting portion 26 and the antenna radiator 23 are not cross-sectional lines respectively corresponding to the second connecting portion 26 and the antenna radiator 23, and are used to facilitate distinction between the second connecting portion 26 and the antenna radiator 23.

A reflection coefficient S11 curve of the antenna architecture in the Bluetooth earphone 100 in this application is illustrated below with an assumption that the operating frequency band of the antenna radiator 23 ranges from 2.4 GHz to 2.5 GHz and with reference to FIG. 19. In FIG. 19, a horizontal coordinate is a frequency in a unit of megahertz (GHz), and a vertical coordinate is a reflection coefficient S11 in a unit of dBa.

As shown in FIG. 19, a curve 1 is an S11 curve based on the structure shown in FIG. 1 and FIG. 2, and a curve 2 is an S11 curve based on the structure shown in FIG. 18. In the curve 2, when an operating frequency of the antenna radiator 23 is 2.4 GHz, an S11 value is −15.501 dBa; and when the operating frequency of the antenna radiator 23 is 2.5 GHz, the S11 value is −15.621 dBa. The S11 value, in the curve 2, at the operating frequency band that ranges from 2.4 GHz to 2.5 GHz is smaller than an S11 value, in the curve 1, at the operating frequency band that ranges from 2.4 GHz to 2.5 GHz. Therefore, it may be learned that an antenna corresponding to the curve 2 has wider bandwidth and better antenna performance.

A system efficiency curve of the antenna architecture in the Bluetooth earphone 100 in this application is illustrated below with an assumption that the operating frequency band of the antenna radiator 23 ranges from 2.4 GHz to 2.5 GHz and with reference to FIG. 20. In FIG. 20, a horizontal coordinate is a frequency in a unit of megahertz (GHz), and a vertical coordinate is system efficiency in a unit of dB.

As shown in FIG. 20, a curve 1 is a system efficiency curve based on the structure shown in FIG. 1 and FIG. 2, and a curve 2 is a system efficiency curve based on the structure shown in FIG. 18. A system efficiency value, in the curve 2, at the operating frequency band that ranges from 2.4 GHz to 2.5 GHz is smaller than a system efficiency value, in the curve 1, at the operating frequency band that ranges from 2.4 GHz to 2.5 GHz. Therefore, it may be learned that the antenna corresponding to the curve 2 has higher efficiency and better antenna performance.

It should be noted that in addition to the three embodiments for the third connecting portion 27, the third connecting portion 27 may be obtained by randomly combining the three embodiments in this application.

For example, Embodiment 1 and Embodiment 2 are combined in this application. In this case, any third connecting portion 27 may include a connecting portion that extends from at least one position that is on the second connecting portion 26 and that is close to the bottom end of the earphone handle portion 12 to a direction close to the top end of the earphone handle portion 12 and a bent connecting portion that extends from the at least one position that is on the second connecting portion 26 and that is close to the bottom end of the earphone handle portion 12 to a direction close to the bottom end of the earphone handle portion 12.

A schematic diagram of directions of the current on the second connecting portion 26, the current on the antenna radiator 23, and the parasitic current on the third connecting portion 27 is described below with reference to FIG. 21 and by using an example in which the second connecting portion 26, the third connecting portion 27, and the antenna radiator 23 are parallel to each other and equal in length and the third connecting portion 27 is implemented by combining Embodiment 1 and Embodiment 2.

As shown in FIG. 21, the current 11 on the second connecting portion 26 flows from the bottom end of the earphone handle portion 12 to the ground point b. The current 12 on the antenna radiator 23 flows from the feed point a to the bottom end of the earphone handle portion 12.

The third connecting portion 27 includes two parts: a connecting portion 271 and a connecting portion 272. A parasitic current 131 on the connecting portion 271 flows from a position at which the connecting portion 271 is connected to the second connecting portion 26 to an end of the connecting portion 271. A parasitic current 132 on the connecting portion 272 flows from a position at which the connecting portion 272 is connected to the second connecting portion 26 to an end of the connecting portion 272 along a body of the connecting portion 272. It may be learned that the current 11 and the current 12 are in opposite directions, the parasitic current 131 and the current 12 are in a same direction, and the parasitic current 132 and the current 12 are not in opposite directions.

For another example, Embodiment 1 and Embodiment 3 are combined in this application. In this case, any third connecting portion 27 may include a connecting portion that extends from at least one position that is on the second connecting portion 26 and that is close to the bottom end of the earphone handle portion 12 to a direction close to the top end of the earphone handle portion 12, a metal outer wall of the battery 29, and a connecting portion connected to the metal outer wall of the battery 29 and the at least one position that is on the second connecting portion 26 and that is close to the bottom end of the earphone handle portion 12.

For another example, Embodiment 2 and Embodiment 3 are combined in this application. In this case, any third connecting portion 27 may include a bent connecting portion that extends from at least one position that is on the second connecting portion 26 and that is close to the bottom end of the earphone handle portion 12 to a direction close to the bottom end of the earphone handle portion 12, a metal outer wall of the battery 29, and a connecting portion connected to the metal outer wall of the battery 29 and the at least one position that is on the second connecting portion 26 and that is close to the bottom end of the earphone handle portion 12.

For another example, Embodiment 1, Embodiment 2, and Embodiment 3 are combined in this application. In this case, any third connecting portion 27 may include a connecting portion that extends from at least one position that is on the second connecting portion 26 and that is close to the bottom end of the earphone handle portion 12 to a direction close to the top end of the earphone handle portion 12, a bent connecting portion that extends from the at least one position that is on the second connecting portion 26 and that is close to the bottom end of the earphone handle portion 12 to a direction close to the bottom end of the earphone handle portion 12, a metal outer wall of the battery 29, and a connecting portion connected to the metal outer wall of the battery 29 and the at least one position that is on the second connecting portion 26 and that is close to the bottom end of the earphone handle portion 12.

To further explain that the Bluetooth earphone 100 in this application has good antenna performance, a comparison between antenna performance of the conventional Bluetooth earphone 200 and antenna performance of the Bluetooth earphone 100 in this application is made below in terms of distribution of a current on the signal processing component 2, a reflection coefficient S11 of the antenna architecture, and system efficiency of the antenna architecture in the Bluetooth earphone 100 in this application.

According to a first aspect, for ease of description, distribution of the current on the signal processing component 2 in the Bluetooth earphone 100 is illustrated with reference to FIG. 22*a*, FIG. 22*b*, and FIG. 22*c* and by using an example in which the second connecting portion 26, the third connecting portion 27, and the antenna radiator 23 are parallel to each other and equal in length.

FIG. 22*a* shows an antenna architecture in which the Bluetooth earphone 100 includes the second connecting portion 26 and the antenna radiator 23, and does not include the third connecting portion 27. The antenna architecture shown in FIG. 22*a* is similar to the antenna architecture in the Bluetooth earphone 200 shown in FIG. 1 and FIG. 2. FIG. 22*b* shows an antenna architecture in which the Bluetooth earphone 100 in this application includes the second connecting portion 26, the antenna radiator 23, and the third connecting portion 27 in Embodiment 2. FIG. 22*c* shows an antenna architecture in which the Bluetooth earphone 100 in this application includes the second connecting portion 26, the antenna radiator 23, and the third connecting portion 27 in Embodiment 3.

As shown in FIG. 22*a*, FIG. 22*b*, and FIG. 22*c*, in comparison with distribution of the current on the signal processing component 2 in FIG. 22*a*, in FIG. 22*b*, the current on the signal processing component 2 is distributed in a wider range and has higher intensity, and in FIG. 22*c*, the current on the signal processing component 2 is distributed in a widest range and has highest intensity. Therefore, in comparison with the conventional Bluetooth earphone 200, for the Bluetooth earphone 100 in this application, the third connecting portion 27 becomes a parasitic component of the antenna radiator 23, and therefore the antenna performance of the Bluetooth earphone 100 is effectively improved.

According to a second aspect, for ease of description, a reflection coefficient S11 curve of the antenna architecture is illustrated with an assumption that the operating frequency band of the antenna radiator 23 ranges from 2.4 GHz to 2.5 GHz, based on the antenna architectures shown in FIG. 22*a*, FIG. 22*b*, and FIG. 22*c*, and with reference to FIG. 23. In FIG. 23, a horizontal coordinate is a frequency in a unit of megahertz (GHz), and a vertical coordinate is a reflection coefficient S11 in a unit of dBa.

As shown in FIG. 23, a curve 1 is an S11 curve based on the antenna architecture shown in FIG. 22*a*, a curve 2 is an S11 curve based on the antenna architecture shown in FIG. 22*b*, and a curve 3 is an S11 curve based on the antenna architecture shown in FIG. 22*c*. Compared with the curve 1, the curve 2 corresponds to good antenna performance, and the curve 3 corresponds to highest antenna performance. Therefore, in comparison with the conventional Bluetooth earphone 200, the antenna performance of the Bluetooth earphone 100 in this application is effectively improved.

According to a third aspect, for ease of description, a system efficiency curve of the antenna architecture is illustrated with an assumption that the operating frequency band of the antenna radiator 23 ranges from 2.4 GHz to 2.5 GHz, based on the antenna architectures shown in FIG. 22*a*, FIG. 22*b*, and FIG. 22*c*, and with reference to FIG. 24. In FIG. 24, a horizontal coordinate is a frequency in a unit of megahertz (GHz), and a vertical coordinate is system efficiency in a unit of dB.

As shown in FIG. 24, a curve 1 is a system efficiency curve based on the antenna architecture shown in FIG. 22*a*, a curve 2 is a system efficiency curve based on the antenna architecture shown in FIG. 22*b*, and a curve 3 is a system efficiency curve based on the antenna architecture shown in FIG. 22*c*. Compared with the curve 1, the curve 2 corresponds to good antenna performance, and the curve 3 corresponds to highest antenna performance. Therefore, in comparison with the conventional Bluetooth earphone 200, the antenna performance of the Bluetooth earphone 100 in this application is effectively improved.

In conclusion, the introduced third connecting portion 27 becomes a parasitic element of the antenna radiator 23. Therefore, the antenna performance of the Bluetooth earphone 100 in this application is improved, so that the Bluetooth earphone 100 in this application can communicate well.

What is claimed is:

1. A BLUETOOTH earphone comprising:

an earphone housing comprising:

an earbud portion; and an earphone handle portion;

a flexible printed circuit (FPC) comprising a first portion, wherein the first portion is disposed in the earphone handle portion and comprises a feed point;

an antenna comprising:

an antenna radiator disposed on the first portion of the FPC and electrically connected to the feed point;

a first connecting portion configured as a main ground of the BLUETOOTH earphone;

a second connecting portion located on the earphone handle portion and comprising a ground point, wherein the ground point is electrically connected to the first connecting portion and is at a preset distance from the feed point; and a third connecting portion located on the earphone handle portion and connected to the second connecting portion at a position different from the ground point, wherein the third connecting portion and the antenna radiator are spaced apart with a gap, and wherein the third connecting portion is configured to be coupled to the antenna radiator through the gap; and a battery, wherein the third connecting portion comprises a metal outer wall of the battery and a fourth connecting portion connected to the metal outer wall and the position.

2. The BLUETOOTH earphone of claim 1, wherein the second connecting portion is disposed on the FPC.

3. The BLUETOOTH earphone of claim 1, wherein the antenna radiator is disposed on the FPC as an insert-molding antenna radiator, a metal-coating antenna radiator, another FPC, or a laser direct structuring (LDS) antenna radiator.

4. The BLUETOOTH earphone of claim 1, wherein the earphone handle portion comprises a top end and a bottom end, wherein the position is closer to the bottom end than the top end, and wherein the third connecting portion comprises a connecting portion that extends from the position to a direction to the top end.

5. The BLUETOOTH earphone of claim 4, wherein the third connecting portion and the second connecting portion form a U-shaped structure.

6. The BLUETOOTH earphone of claim 4, wherein the third connecting portion is disposed on the FPC.

7. The BLUETOOTH earphone of claim 4, further comprising an overlapping region between a projection of the third connecting portion in a vertical direction of a plane on which the FPC is located, and the antenna radiator.

8. The BLUETOOTH earphone of claim 1, wherein a projection of the third connecting portion in a vertical direction of a plane on which the FPC is located is closely adjacent to the antenna radiator.

9. The BLUETOOTH earphone of claim 1, wherein the earphone handle portion comprises a top end and a bottom end, wherein the position is closer to the bottom end than the top end, and wherein the third connecting portion comprises a bent connecting portion that extends from the position to a direction to the bottom end.

10. The BLUETOOTH earphone of claim 9, wherein a projection of the third connecting portion in a vertical direction of a plane on which the FPC is located is closely adjacent to the second connecting portion.

11. The BLUETOOTH earphone of claim 1, wherein the feed point is located at a top end of the earphone handle portion, and wherein the ground point is located on the earphone handle portion.

12. The BLUETOOTH earphone of claim 1, wherein a length of the antenna radiator is less than $\frac{1}{4}$ of a wavelength corresponding to an operating frequency band of the antenna.

13. The BLUETOOTH earphone of claim 12, wherein a total length of the second connecting portion and the third connecting portion is greater than $\frac{1}{4}$ of the wavelength.

14. The BLUETOOTH earphone of claim 12, wherein a total length of the second connecting portion and the third connecting portion is less than or equal to $\frac{1}{2}$ of the wavelength.

15. The BLUETOOTH earphone of claim 1, wherein a length of the first connecting portion is less than $\frac{1}{4}$ of a wavelength corresponding to an operating frequency band of the antenna.

16. The BLUETOOTH earphone of claim 1, wherein the antenna radiator is configured to flow a current from the feed point to a bottom end of the earphone handle portion, wherein the third connecting portion is configured to flow a parasitic current from the position to an end of the third connecting portion, and wherein the current and the parasitic current are not in opposite directions.

17. The BLUETOOTH earphone of claim 1, wherein at least a portion of the FPC extends to the earbud portion along a top end of the earphone handle portion.

18. The BLUETOOTH earphone of claim 1, wherein the first connecting portion is located in the earbud portion.

19. The BLUETOOTH earphone of claim 1, wherein the second connecting portion is disposed on the FPC as an insert-molding antenna radiator, a metal-coating antenna radiator, another FPC, or a laser direct structuring (LDS) antenna radiator.

20. The BLUETOOTH earphone of claim 1, wherein the position is close to a bottom end of the earphone handle portion.

* * * * *